United States Patent
Hwang et al.

(10) Patent No.: US 11,293,689 B2
(45) Date of Patent: Apr. 5, 2022

(54) METHOD FOR GENERATING SCHEDULE DATA USING ARTIFICIAL INTELLIGENCE BASED ON ACTION DATA, AND SERVER AND REFRIGERATOR FOR IMPLEMENTING THE SAME

(71) Applicant: LG Electronics Inc., Seoul (KR)

(72) Inventors: Sung Mok Hwang, Seoul (KR); Young Tag Kwon, Seoul (KR); Jin-Hoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 22 days.

(21) Appl. No.: 16/494,185

(22) PCT Filed: Mar. 14, 2018

(86) PCT No.: PCT/KR2018/003006
§ 371 (c)(1),
(2) Date: Sep. 13, 2019

(87) PCT Pub. No.: WO2018/169313
PCT Pub. Date: Sep. 20, 2018

(65) Prior Publication Data
US 2020/0018540 A1    Jan. 16, 2020

(30) Foreign Application Priority Data
Mar. 15, 2017    (KR) .................. 10-2017-0032697

(51) Int. Cl.
*F25D 29/00*    (2006.01)
*G06N 20/00*    (2019.01)
(Continued)

(52) U.S. Cl.
CPC .......... *F25D 29/00* (2013.01); *G05B 13/0265* (2013.01); *G06N 5/04* (2013.01); *G06N 20/00* (2019.01)

(58) Field of Classification Search
CPC ...... F25D 29/00; G05B 13/0265; G06N 5/04; G06N 20/00
See application file for complete search history.

(56) References Cited

U.S. PATENT DOCUMENTS

| | | | |
|---|---|---|---|
| 5,315,835 A | 5/1994 | Park | |
| 2004/0050075 A1* | 3/2004 | King | ...................... F25D 29/00 62/131 |

(Continued)

FOREIGN PATENT DOCUMENTS

| | | |
|---|---|---|
| CN | 103578257 | 2/2014 |
| EP | 1926045 | 5/2008 |

(Continued)

OTHER PUBLICATIONS

Yu Eung Jae, Device and method for controlling of drive schedule in network operating center building energy management system, 2013, google patents, pp. 1-11 (Year: 2013) (Year: 2013).*

(Continued)

*Primary Examiner* — Rocio Del Mar Perez-Velez
*Assistant Examiner* — Yvonne Trang Follansbee
(74) *Attorney, Agent, or Firm* — Fish & Richardson P.C.

(57) ABSTRACT

Disclosed herein is a method for generating schedule data based on action data, and a server and a refrigerator implementing the same. The method for generating schedule data based on action data according to an embodiment of the present invention includes, in a refrigerator including one or more divided storage spaces, a step of a storage unit of the refrigerator storing pattern base data including action data performed by the refrigerator and time data, a step of a communication unit of the refrigerator receiving a first learning data set from a server, a step of a schedule generation unit of the refrigerator generating first schedule data including predicted action data of the refrigerator and time data of the predicted action data by mapping a first learning (Continued)

data set to the pattern base data, and a step of a control unit of the refrigerator controlling an action of the refrigerator based on the first schedule data.

17 Claims, 18 Drawing Sheets

(51) Int. Cl.
*G05B 13/02* (2006.01)
*G06N 5/04* (2006.01)

(56) References Cited

U.S. PATENT DOCUMENTS

| | | | |
|---|---|---|---|
| 2008/0195237 A1 | 8/2008 | Mukaigawa et al. | |
| 2010/0305794 A1 | 12/2010 | Foster | |
| 2012/0290230 A1 | 11/2012 | Gonzalez et al. | |
| 2013/0144451 A1* | 6/2013 | Kumar | G05B 13/02 700/291 |
| 2014/0058567 A1* | 2/2014 | Matsuoka | F24F 11/30 700/276 |
| 2014/0316581 A1* | 10/2014 | Fadell | F24F 11/30 700/276 |
| 2015/0161515 A1* | 6/2015 | Matsuoka | G06F 16/3334 706/17 |
| 2015/0302510 A1 | 10/2015 | Godsey et al. | |
| 2016/0171622 A1* | 6/2016 | Perkins | H04N 5/232 705/4 |
| 2019/0078833 A1 | 3/2019 | Graziano | |
| 2020/0027154 A1 | 1/2020 | Godsey et al. | |

FOREIGN PATENT DOCUMENTS

| | | | |
|---|---|---|---|
| EP | 1935712 | | 6/2008 |
| EP | 3064874 | | 9/2016 |
| JP | H0526555 | A * | 2/1993 |
| JP | 2003111157 | | 4/2003 |
| JP | 2004113681 | | 4/2004 |
| KR | 20070032511 | | 3/2007 |
| KR | 100705767 | | 4/2007 |
| KR | 20120006287 | | 1/2012 |
| KR | 20130120866 | A * | 11/2013 |
| KR | 20140099594 | | 8/2014 |
| KR | 20150093357 | | 8/2015 |
| KR | 20160148897 | | 12/2016 |
| WO | WO2011002735 | | 1/2011 |

OTHER PUBLICATIONS

Hirata, Method and controller for cooling operation of refrigerator, google patents, machine translation of JPH0526555A (Year: 1993).*
Partial European Search Report in European Appln. No. 18767297.7, dated Mar. 24, 2021, 17 pages.
EP Extended European Search Report in EP Appln. No. 18767297.7, dated Jun. 11, 2021, 16 pages.

* cited by examiner

FIG. 1
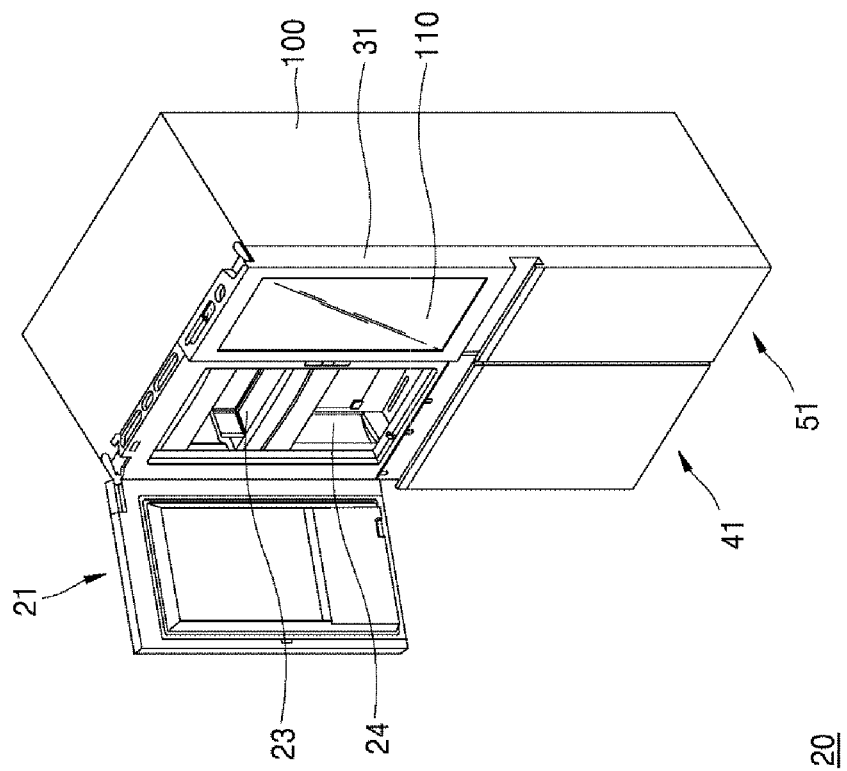
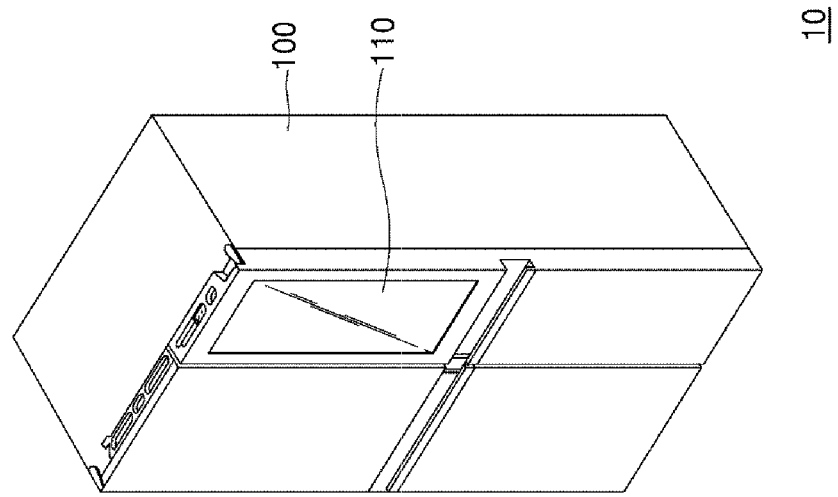

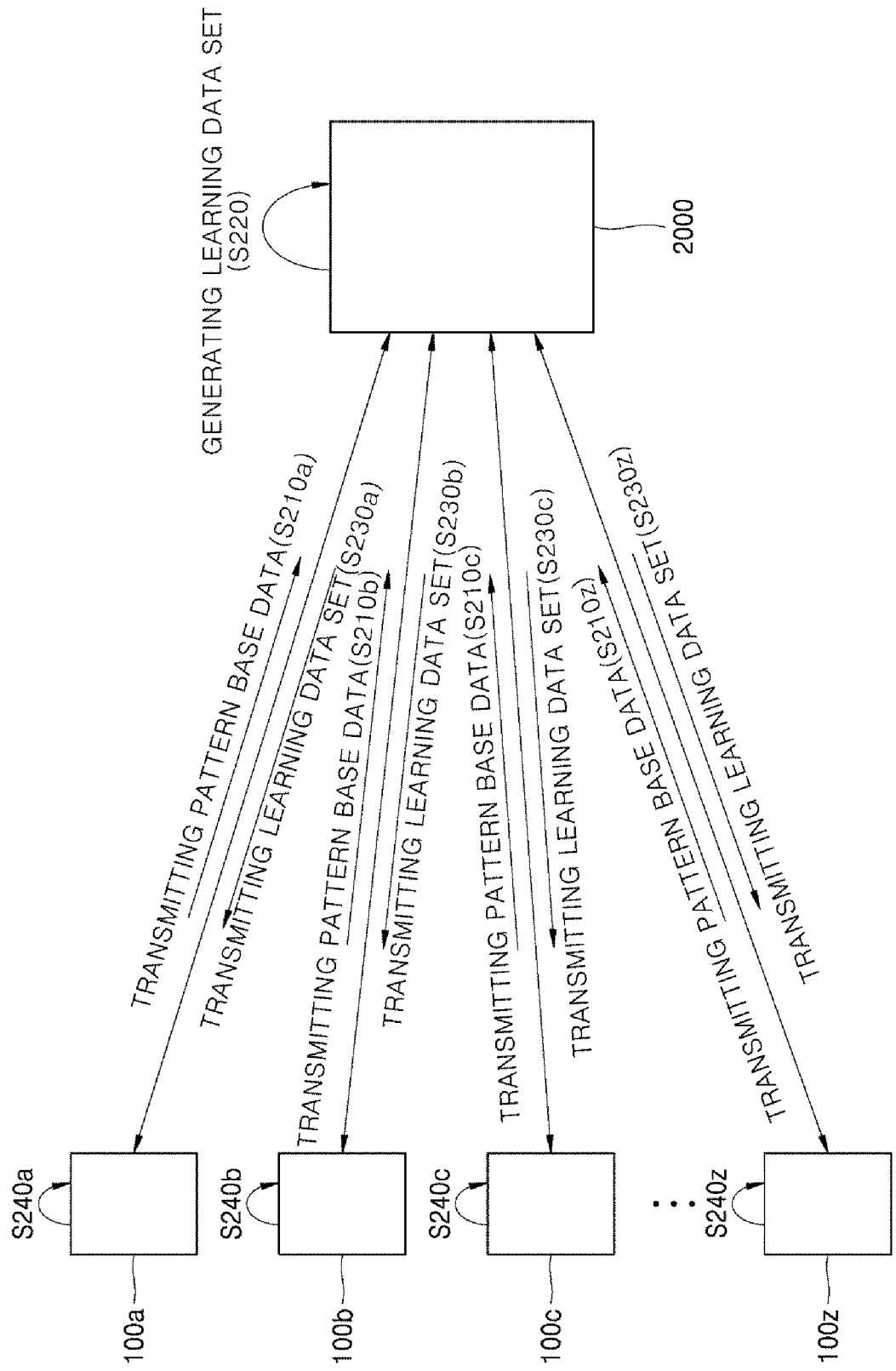

FIG. 3

| UNIT TIME | FIRST DAY | |
|---|---|---|
| | ACTION DATA (ActData(Day, Time)) | TIME DATA (TimeData(Day, Time)) |
| 0 | ActData(1, 0) | TimeData(1, 0) |
| 1 | ActData(1, 1) | TimeData(1, 1) |
| 2 | ActData(1, 2) | TimeData(1, 2) |
| 3 | ActData(1, 3) | TimeData(1, 3) |
| 4 | ActData(1, 4) | TimeData(1, 4) |
| 5 | ActData(1, 5) | TimeData(1, 5) |
| 6 | ActData(1, 6) | TimeData(1, 6) |
| 7 | ActData(1, 7) | TimeData(1, 7) |
| 8 | ActData(1, 8) | TimeData(1, 8) |
| 9 | ActData(1, 9) | TimeData(1, 9) |
| 10 | ActData(1, 10) | TimeData(1, 10) |
| 11 | ActData(1, 11) | TimeData(1, 11) |
| 12 | ActData(1, 12) | TimeData(1, 12) |
| 13 | ActData(1, 13) | TimeData(1, 13) |
| 14 | ActData(1, 14) | TimeData(1, 14) |
| 15 | ActData(1, 15) | TimeData(1, 15) |
| 16 | ActData(1, 16) | TimeData(1, 16) |
| 17 | ActData(1, 17) | TimeData(1, 17) |
| 18 | ActData(1, 18) | TimeData(1, 18) |
| 19 | ActData(1, 19) | TimeData(1, 19) |
| 20 | ActData(1, 20) | TimeData(1, 20) |
| 21 | ActData(1, 21) | TimeData(1, 21) |
| 22 | ActData(1, 22) | TimeData(1, 22) |
| 23 | ActData(1, 23) | TimeData(1, 23) |

| TIME UNIT | FIRST DAY | | SECOND DAY | | THIRD DAY | | FOURTH DAY | | FIFTH DAY | | SIXTH DAY | | SEVENTH DAY | |
|---|---|---|---|---|---|---|---|---|---|---|---|---|---|---|
| | ACTION DATA | TIME DATA | ACTION DATA | TIME DATA | ACTION DATA | TIME DATA | ACTION DATA | TIME DATA | ACTION DATA | TIME DATA | ACTION DATA | TIME DATA | ACTION DATA | TIME DATA |
| 0 | 1 | 24 | 1 | 0 | 1 | 13 | 1 | 0 | 1 | 0 | 1 | 26 | 0 | 0 |
| 1 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 |
| 3 | 0 | 0 | 0 | 0 | 1 | 24 | 0 | 0 | 1 | 0 | 0 | 0 | 0 | 0 |
| 4 | 0 | 0 | 1 | 0 | 0 | 0 | 1 | 0 | 0 | 0 | 1 | 0 | 1 | 0 |
| 5 | 0 | 0 | 1 | 0 | 1 | 0 | 0 | 0 | 1 | 0 | 1 | 96 | 1 | 0 |
| 6 | 1 | 62 | 1 | 93 | 1 | 0 | 1 | 106 | 1 | 0 | 0 | 0 | 0 | 0 |
| 7 | 1 | 65 | 0 | 65 | 1 | 0 | 0 | 0 | 1 | 0 | 1 | 0 | 1 | 150 |
| 8 | 1 | 25 | 1 | 32 | 0 | 35 | 1 | 21 | 0 | 127 | 0 | 75 | 0 | 89 |
| 9 | 0 | 0 | 0 | 0 | 0 | 0 | 0 | 0 | 1 | 0 | 1 | 20 | 0 | 44 |
| 10 | 0 | 0 | 0 | 0 | 0 | 0 | 0 | 0 | 0 | 45 | 0 | 0 | 1 | 321 |
| 11 | 0 | 300 | 0 | 240 | 0 | 365 | 1 | 71 | 0 | 0 | 0 | 0 | 1 | 0 |
| 12 | 1 | 93 | 1 | 105 | 1 | 25 | 0 | 0 | 1 | 9 | 1 | 120 | 1 | 0 |
| 13 | 1 | 0 | 1 | 10 | 1 | 0 | 1 | 20 | 1 | 71 | 1 | 105 | 1 | 0 |
| 14 | 1 | 12 | 1 | 12 | 1 | 0 | 1 | 5 | 0 | 0 | 0 | 10 | 0 | 0 |
| 15 | 0 | 103 | 0 | 103 | 0 | 150 | 0 | 35 | 0 | 67 | 1 | 12 | 1 | 0 |
| 16 | 0 | 77 | 1 | 80 | 0 | 93 | 1 | 40 | 1 | 29 | 0 | 0 | 0 | 0 |
| 17 | 1 | 101 | 1 | 65 | 1 | 0 | 1 | 16 | 0 | 0 | 1 | 0 | 0 | 0 |
| 18 | 0 | 16 | 0 | 12 | 0 | 12 | 0 | 29 | 0 | 4 | 0 | 0 | 1 | 102 |
| 19 | 0 | 34 | 0 | 35 | 0 | 103 | 1 | 0 | 0 | 9 | 1 | 32 | 1 | 50 |
| 20 | 1 | 9 | 1 | 9 | 1 | 77 | 1 | 4 | 0 | 50 | 0 | 0 | 0 | 0 |
| 21 | 0 | 0 | 0 | 0 | 0 | 31 | 0 | 9 | 0 | 0 | 1 | 0 | 0 | 0 |
| 22 | 0 | 12 | 0 | 16 | 0 | 24 | 0 | 0 | 0 | 0 | 0 | 0 | 0 | 0 |
| 23 | 0 | 35 | 0 | 34 | 1 | 0 | 0 | 0 | 1 | 0 | 0 | 0 | 1 | 0 |

320

FIG. 18
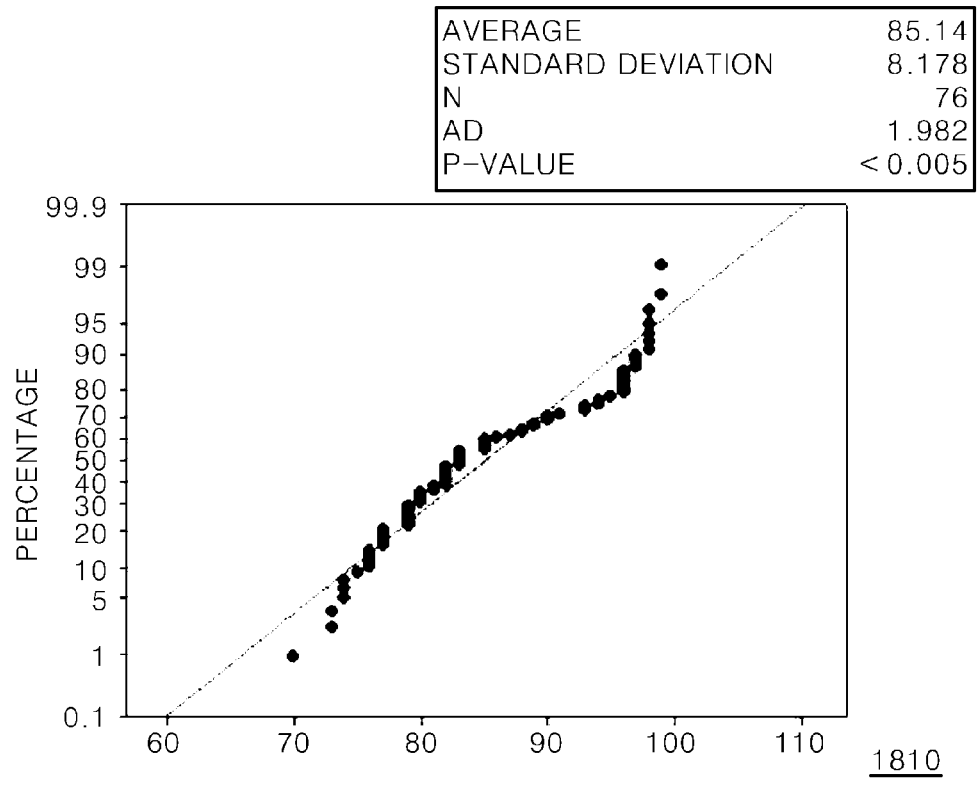
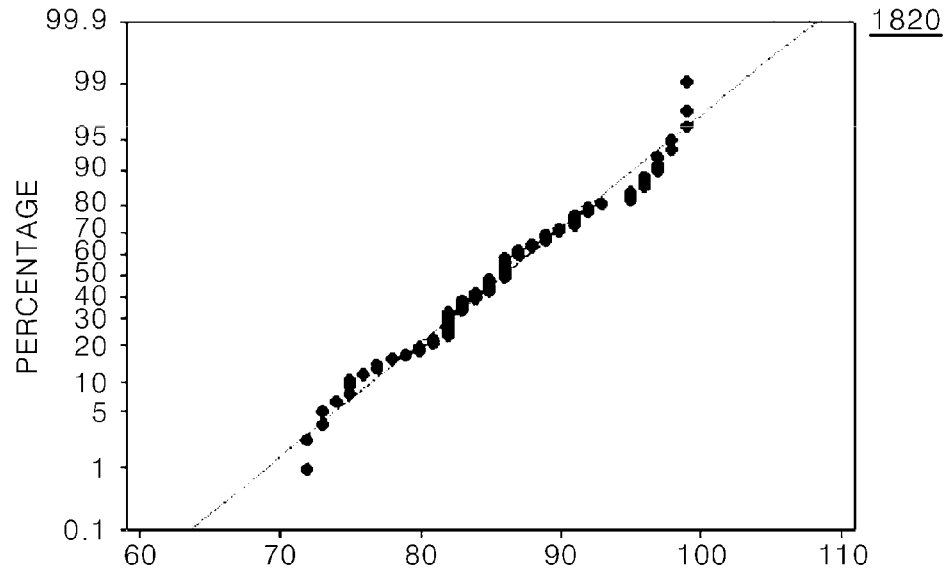

METHOD FOR GENERATING SCHEDULE DATA USING ARTIFICIAL INTELLIGENCE BASED ON ACTION DATA, AND SERVER AND REFRIGERATOR FOR IMPLEMENTING THE SAME

CROSS-REFERENCE TO RELATED APPLICATIONS

This application is a National Stage application under 35 U.S.C. § 371 of International Application No. PCT/KR2018/003006, filed on Mar. 14, 2018, which claims the benefit of Korean Patent Application No. 10-2017-0032697, filed on Mar. 15, 2017. The disclosures of the prior applications are incorporated by reference in their entirety.

TECHNICAL FIELD

The present invention relates to a method for generating schedule data based on action data, and a server and a refrigerator implementing the same.

BACKGROUND ART

A refrigerator, which is an apparatus for maintaining or cooling temperatures of various kinds of stored goods at a low temperature, includes a storeroom composed of one or more separate spaces. The refrigerator has a temperature change interval that may be maintained at a maximum in a process of generating a product and shipping the product, and a user may set a temperature of the refrigerator by adjusting a temperature of the refrigerator within the interval.

A temperature control of the refrigerator may vary depending on a usage pattern of the user. When the refrigerator is able to predict a use or opening of the refrigerator at a particular time in advance, it is possible to generate schedule data on an action of the refrigerator based on the prediction and operate the refrigerator based on the schedule data.

Referring to a conventional refrigerator, an on-state and an off-state of a compressor may iterate in response to a temperature value inside the refrigerator. When the temperature value inside the refrigerator is equal to or greater than a predetermined temperature, the compressor is turned on to drive a refrigeration cycle. Conversely, when the temperature value inside the refrigerator is equal to or less than the predetermined temperature, it is not necessary to supply cold air, and as a result that the compressor may be turned off. However, when the refrigerator operates only by a change in the temperature value of the refrigerator, or the refrigerator operates in response to the existing predetermined temperature, it may not be suitable for an actual condition of the refrigerator. Therefore, in a state in which actually required cooling or freezing efficiency is not satisfied, power consumption of the refrigerator may increase.

Thus, a method for predicting an action of the refrigerator and allowing the refrigerator to operate based on the prediction is necessary.

DISCLOSURE

Technical Problem

An aspect of the present invention provides a method and apparatus for scheduling a forthcoming action of a refrigerator based on an action state or a former action data of the refrigerator.

Another aspect of the present invention provides a method and apparatus for scheduling a forthcoming action of a refrigerator by acquiring data on actions from a plurality of refrigerators and using a result of learning from the data so as to improve accuracy in relation to action prediction of the refrigerator.

Still another aspect of the present invention provides a method and apparatus for more accurately scheduling a forthcoming action of a refrigerator by using a result of continuously accumulating and learning data on actions generated by the refrigerator.

Aspects of the present invention are not limited to the above-described aspects, and the other aspects and advantages of the present invention will become apparent from the following description of embodiments. In addition, it is easily understood that the aspects and advantages of the present invention can be achieved by the means described in the claims and a combination thereof.

Technical Solution

A method for generating schedule data based on action data according to an embodiment of the present invention may include, in a refrigerator including one or more divided storage spaces, a step of a storage unit of the refrigerator storing pattern base data including action data performed by the refrigerator and time data, a step of a communication unit of the refrigerator receiving a first learning data set from a server, a step of a schedule generation unit generating first schedule data including predicted action data of the refrigerator and time data of the predicted action data by mapping the first learning data set to the pattern base data, and a step of a control unit of the refrigerator controlling an action of the refrigerator based on the first schedule data.

A refrigerator configured to generate schedule data based on action data according to another embodiment of the present invention may include, in a refrigerator including one or more divided storage spaces, a storage unit storing first pattern base data including action data performed by the refrigerator during a learning unit period and time data, a schedule generation unit generating first schedule data including predicted action data of the refrigerator and time data of the predicted action data by mapping a first learning data set to the first pattern base data, a communication unit receiving a first learning data set from a server and transmitting second pattern base data generated during an upload unit period to the server, and a control unit generating first pattern base data and storing the first pattern base data in the storage unit, storing the first schedule data generated by the schedule generation unit in the storage unit, and controlling the refrigerator according to the first schedule data.

A method for generating schedule data based on action data according to still another embodiment of the present invention may include a step of a communication unit of a server receiving pattern base data from two or more refrigerators during a learning unit period, a step of the received pattern base data being inputted to a data set generation unit of the server, a step of the data set generation unit generating a temporary learning data set optimized for the inputted pattern base data by changing all or a part of the first learning data set, a step of the communication unit and the data set generation unit generating a second learning data set by repeating the step of receiving the pattern base data, the step of the pattern base data being inputted and the step of generating the temporary learning data set, and a step of the communication unit transmitting the second learning data set to the refrigerators.

A server configured to generate schedule data based on action data according to still another embodiment of the present invention may include a communication unit receiving pattern base data from two or more refrigerators during a learning unit period and transmitting a learning data set to the refrigerators, a data set generation unit generating a temporary learning data set optimized for the pattern base data by receiving the pattern base data and changing all or a part of the first learning data set, and a control unit controlling the communication unit that and the data set generation unit wherein the data set generation unit generates a second learning data set.

Advantageous Effects

When the present invention is applied, an action of a refrigerator may be controlled based on a predicted pattern of the refrigerator, thereby improving performance of the refrigerator while minimizing power consumption of the refrigerator.

Further, when the present invention is applied, refrigerators may acquire an action pattern of a refrigerator from a plurality of refrigerators, learn the action pattern and receive a result of learning, thereby predicting an action of a new refrigerator based on a former action pattern on the basis of the present time, and driving the refrigerator according to the prediction. Thus, the refrigerator may more accurately operate in a power saving mode or a normal mode. As a result, an effect of reducing energy may be enhanced.

When the present invention is applied, it is possible to overcome a limitation of limited learning based on a limited action pattern of an individual refrigerator in the individual refrigerator.

When the present invention is applied, a newly installed refrigerator may also install learning data that is generated based on actions and usage patterns of the previous other refrigerators, thereby more quickly predicting an action suitable for a usage pattern.

Effects according to embodiments are not limited the aforementioned effects. Those skilled in the art can easily derive various effects from the embodiments disclosed herein.

DESCRIPTION OF DRAWINGS

FIG. 1 is a view showing a refrigerator that operates based on schedule data according to an embodiment of the present invention.

FIG. 2 is a view showing pattern base data between a plurality of refrigerators and a server, and an action process required for each refrigerator to generate schedule data according to an embodiment of the present invention.

FIG. 3 is a view showing a configuration of pattern base data according to an embodiment of the present invention.

FIG. 4 is a view showing pattern base data accumulated for 7 days according to an embodiment of the present invention.

FIG. 18 is a view showing experimental results that satisfy normality when an embodiment of the present invention is applied.

DETAILED DESCRIPTION OF EXEMPLARY EMBODIMENTS

Figure 5:
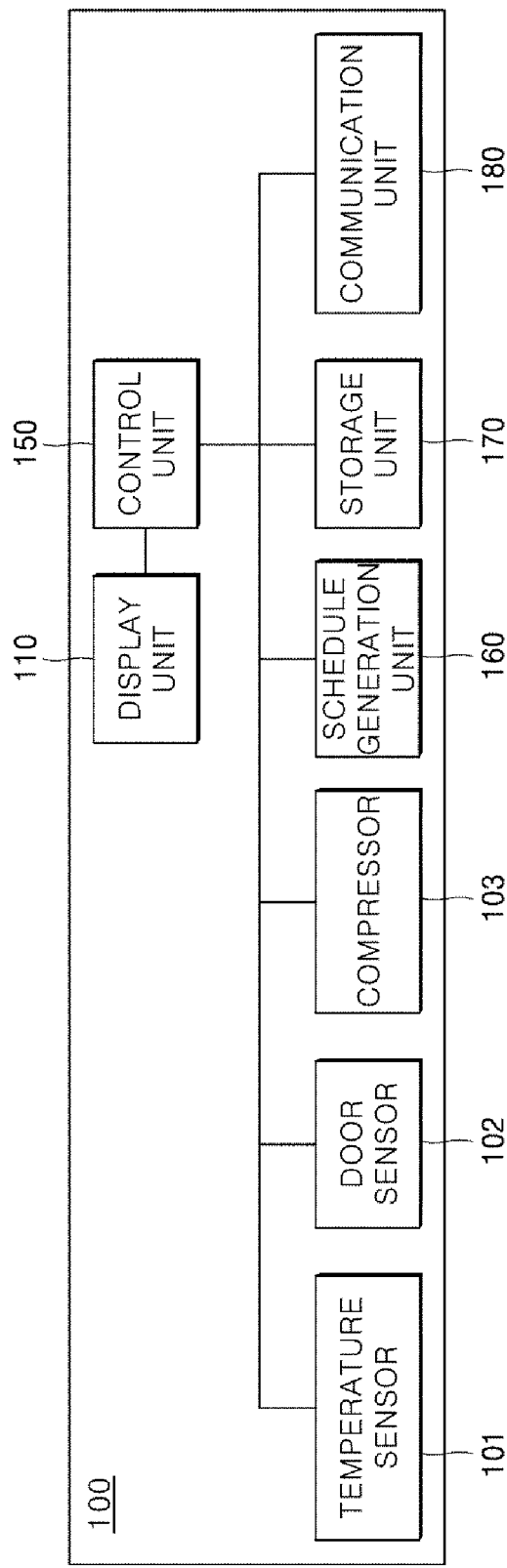
FIG. 5 is a view showing a configuration of a refrigerator according to an embodiment of the present invention.

Hereinafter, embodiments of the present invention will be described in detailed with reference to the accompanying drawings so that those skilled in the art can easily carry out the present invention. The present invention is not limited to the embodiments disclosed herein but may be implemented in various different forms.

In order to clearly describe the embodiments, the description irrelevant to the embodiments has been omitted. Same or like reference numerals designate same or like components throughout the specification. Further, some embodiments will be described in detail with reference to the illustrative drawings. Regarding the reference numerals assigned to the components in the drawings, it should be noted that the same components will be designated by the same reference numerals, wherever possible, even though they are shown in different drawings. Furthermore, in relation to describing the present invention, the detailed description of well-known related configurations or functions can be omitted when it is deemed that such description may cause ambiguous interpretation of the present invention.

Also, in relation to describing components of the present invention, terms such as first, second, A, B, (a), (b) or the like may be used. Each of these terms is not used to define an essence, order, sequence or the number of a relevant component but used merely to distinguish the relevant component from other component(s). It should be noted that, when it is described in the specification that one component is "connected," "coupled" or "joined" to another component, the former may be directly "connected," "coupled," and "joined" to the latter or "connected", "coupled", and "joined" to the latter via another component.

In addition, in relation to implementing the present invention, features of the present invention may be described as being performed by separate components for ease of explanation. However, these features may be implemented by a single device or module or one feature may be implemented by several devices or modules.

In the present specification, a refrigerator is mainly described as an apparatus for cooling or freezing stored goods. The refrigerator may include various apparatuses configured to mainly perform a cooling and freezing function such as a general refrigerator that stores a food, a kimchi refrigerator, a beverage refrigerator, a household refrigerator, a commercial refrigerator, a freezing apparatus composed of only a freezer, and the like. Also, the refrigerator may be an apparatus configured to cool non-food stored goods such as a cosmetic refrigerator. In addition, a refrigeration apparatus installed in a movable type rather than a stationary type, for example, a large-size refrigerated trailer, may be also included in embodiments referred to herein.

The present invention relates to a refrigerator configured to acquire action data from a plurality of refrigerators, predict a forthcoming action based on the action data, generate schedule data based on the prediction, and operate based on the schedule data, and a server configured to generate the schedule data.

FIG. 1 is a view showing a refrigerator that operates based on schedule data according to an embodiment of the present invention. 10 indicates an appearance of a refrigerator 100 in a closed state, and 20 indicates an appearance of the refrigerator 100 in an open state. A space that is opened and closed by one door 21 of a plurality of doors 21, 31, 41 and 51 constituting the refrigerator 100 may be divided into a plurality of storage spaces 23 and 24, and temperatures of the respective storage spaces 23 and 24 may be controlled independently. Of course, with respect to spaces opened and closed by one door, temperatures thereof may be controlled in the same manner.

The refrigerator 100 may further include a display unit 110 configured to display data or an inner space of the refrigerator 100. The display unit 110 may be disposed on a front surface of a particular door 31 or a side surface of the refrigerator 100.

In order to control a temperature of the refrigerator 100 as shown in FIG. 1, a temperature sensor configured to sense a temperature inside a storage space and a temperature control unit configured to control a temperature for each storage space may be provided. In addition, a storage unit is configured to store schedule data so that the refrigerator is operated by the control unit based on the schedule data according to an embodiment of the present invention, and a communication unit is configured to transmit pattern base data of a refrigerator required for generating the schedule data to a server. The pattern base data will be described later.

FIG. 2 is a view showing pattern base data between a plurality of refrigerators and a server, and an action process required for each refrigerator to generate schedule data according to an embodiment of the present invention.

Respective refrigerators 100a, 100b, . . . , 100z may transmit pattern base data to a server 2000 at steps S210a to S210z. That is, the respective refrigerators 100a, 100b, . . . , 100z may transmit pattern base data including data of actions(i.e., action data) performed by a refrigerator during a upload unit period and time data at steps S210a to S210z. The pattern base data may be transmitted to the server 2000 at different time points for each refrigerator, or all refrigerators or some refrigerators may transmit the pattern base data to the server 2000 at the same time point.

The upload unit period means a cycle of accumulating action data generated by an action of a refrigerator and time data corresponding to or related to the action on the server 2000 for 1 hour, 12 hours, 1 day, 2 days, 1 week, or the like, and then uploading the accumulated action data and time data. Of course, the refrigerators 100a, 100b, . . . , 100z may upload the pattern base data every hour in real time, but the upload unit period may be set in consideration of a load of the server 2000, learning or an interval for learning of the server 2000, and the like. In the embodiments of the present invention, it is described that pattern base data accumulated for one day is transmitted, but the present invention is not limited thereto.

The server 2000 may generate a learning data set by applying a deep learning module or a machine learning module based on the received pattern base data at step S220.

The learning data set means a learning data set required for the refrigerators 100a, 100b, . . . , 100z to generate schedule data by using the pattern base data accumulated during the learning unit period as input values. That is, the plurality of refrigerators 100a, 100b, . . . , 100z may transmit the pattern base data according to a upload unit, and when the pattern base data is accumulated during the learning unit period, the refrigerators 100a, 100b, . . . , 100z may generate a learning data set based thereon.

Then, the server 2000 may transmit the generated learning data set to the refrigerators 100a, 100b, . . . , 100z at steps S230a to S230z. The transmitted data set may be set in a program module provided in each of the refrigerators 100a, 100b, . . . , 100z, and the refrigerators 100a, 100b, . . . , 100z may generate a new schedule data by using a new learning data set and the existing pattern base data accumulated during the learning unit period as an input value.

In addition, a control unit 150 may control an action of a refrigerator at steps S240a to S240z. More specifically, when schedule data indicates a power saving mode or a normal mode for controlling an action of a compressor 103, the control unit 150 may control the compressor 103 so that the refrigerator operates in the power saving mode and the normal mode according to the schedule data.

FIG. 3 is a view showing a configuration of pattern base data according to an embodiment of the present invention.

Pattern base data is a record of actions taken by a refrigerator per unit time period (30 minutes, 1 hour, or various time ranges). In one embodiment, assuming that unit time period is one hour, action data generated by the refrigerator for one hour may be stored in a form of pattern base data. In one embodiment, the action data may be data on whether or not the refrigerator has performed a load response.

Also, the time data may be accumulated opening time of the refrigerator.

In summary, it is possible to store data on whether or not an action related to a schedule of the refrigerator has been performed for each unit time period as action data, and action time of the refrigerator accumulated for unit time period as time data. The action data and the time data may constitute pattern base data according to a predetermined time period (24 hours and 1 week).

310 of FIG. 3 shows pattern base data in which action data and time data each using every hour of one day as unit time period are accumulated. ActData (Day, Time) shows data that the refrigerator has operated at a particular time on a particular date. Of course, the action data and the time data may be divided into various details. For example, in one embodiment, a method for indicating action data on whether or not a load response action is performed as 0 or 1 is described. When the load response action has certain steps, different values (0, 1, 2, and the like) may be assigned for respective steps. This configuration will be described in more detail.

In one embodiment of the pattern base data, the control unit 150 may configure whether or not the load response action has been performed as action data. In this case, ActData (Day, Time) may have a value of 0 or 1. For example, 0 means that no load response action has been performed, and 1 means that the load response action has been performed. Also, when the accumulated number of times the load response action has been performed is indicated as ActData (Day, Time), a number may be a natural number of 0 or more.

When action data indicates N actions that the refrigerator may take, the action data may be set to have a value ranging from 0 to N. For example, when the load response action has N levels, the action data may be set to have a value of 0 when no load response action is performed; a value of 1 when 1 level of load response action is performed; and a value of N when an N level of load response action is performed.

According to this configuration, ActData (1, 10) may indicate a load response action of a refrigerator performed during 10 unit time of a first day.

TimeData (Day, Time) may indicate times in which a refrigerator performs a particular action within each unit time. For example, times when a door of the refrigerator is opened may be accumulated and stored as a value of TimeData (Day, Time). The times in which the door of the refrigerator is opened may be counted by accumulating times in which an open state of the door is identified within each unit time, and a time period during which the door is opened above a predetermined level while the door is kept open. The time data may be accumulated by applying a weight thereto.

For example, when the door is opened three times within unit time of 1:00 pm and an open state is kept for 20 seconds for each time, a value of TimeData (1, 13) may be set to 60. Similarly, when the door is opened once within unit time of 4:00 pm and an open state is kept for 60 seconds, a value of TimeData (1, 16) may be set to 60.

In another embodiment, when the number of times of accumulated time data is more than twice, and accordingly a weight of 1.5 is applied, a value of TimeData (1, 13) may be 90.

When the control unit 150 sets how time data of the refrigerator is to be accumulated, the data may be accumulated in various ways accordingly. In an accumulation process of the time data, a weight may be predetermined or a learning data set to be described later may change the accumulated time data to a new value. The time data may reflect not only data on the time when the refrigerator is opened and closed but also frequency data. Also, when the refrigerator has a strong cooling mode, accumulated data of the time when the refrigerator operates in the strong cooling mode may constitute time data.

FIG. 4 is a view showing pattern base data accumulated for 7 days according to an embodiment of the present invention. Data (1 or 0) on whether or not the load response action has been performed for each unit time for 7 days and data on the number of times when the door of the refrigerator is opened may be stored as shown in 320. The pattern base data may be an input value for generating a schedule, or the pattern base data may be transmitted to the server for generating a learning data set of a schedule module.

That is, it is possible to generate a learning data set of a schedule module that controls the server 2000 to deliver energy savings in the future by performing pattern analysis on former action data and states of a plurality of refrigerators, and provide the learning data set back to the plurality of refrigerators.

The refrigerators may calculate schedule data suitable for each refrigerator by using the received learning data set and the previously stored pattern base data. The server 2000 may analyze a pattern of refrigeration outputs of a refrigerator used in each home and operate as a system for predicting an action state of the refrigerator during a forthcoming particular period (for example, one week), as a power saving mode and a normal (non-power saving) mode.

FIG. 5 is a view showing a configuration of a refrigerator according to an embodiment of the present invention. Components for controlling an action of the refrigerator are shown therein. The control unit 150 may control a plurality of components.

As components directly related to an action of the refrigerator, the refrigerator may include a temperature sensor 101 configured to measure a temperature of a storage space of the refrigerator, a door sensor 102 configured to sense opening and closing of a door of the storage space, and a compressor 103 configured to adjust a temperature of the storage space by compressing a refrigerant so as to supply cold air to the storage space according to control of the control unit 150.

When it takes a long time to drive the compressor 103 or the compressor 103 operates at a high speed, relatively much cool air may be generated, and thus the temperature of the storage space may be relatively lowered. Conversely, when it takes a short time to drive the compressor 103 or the compressor 103 operates at a low speed, relatively little cold air may be generated, and thus the temperature of the storage space may be relatively less lowered.

The control unit 150 may control an action of the compressor 103 according to the generated schedule. A mode to control an action may be divided into a power saving mode and a normal mode (general mode). Alternatively, the mode to control an action may be divided into a power saving mode, a normal mode, and a strong cooling mode. The mode may be configured in various ways and vary depending on a configuration of the invention.

A division of the mode means a way that the refrigerator operates. When the mode of the refrigerator is scheduled as the normal mode according to an embodiment of the present invention, the control unit 150 may control driving of the refrigerator by controlling the compressor 103 so as to maintain the temperature of the storage space set by a user. When the mode of the refrigerator is scheduled as the power saving mode, the control unit 150 may control driving of the refrigerator by controlling the compressor 103 so as to maintain the temperature of the storage space higher than the temperature of the storage space set by the user.

When the refrigerator is driven in the power saving mode, the temperature of the storage space may increase, and thus the refrigerator may consume less energy to cool the storage space in comparison to the refrigerator driven in the normal mode, and energy may be saved. Therefore, the control unit 150 may control driving of the power saving mode and the normal mode of the refrigerator according to schedule data learned and calculated by not only the relevant refrigerator but also the other refrigerators.

A schedule generation unit 160 may generate predetermined schedule data by using a plurality of pattern base data stored in a storage unit 170. For this purpose, the schedule generation unit 160 may include a learning data set for calculating schedule data from the pattern base data. And, a communication unit 180 may receive the learning data set from the server 2000 in a real time or according to a predetermined cycle. As a result, the schedule generation unit 160 may generate schedule data by applying a new learning data set so that it is optimally predictable with respect to the pattern base data.

In summary, in the refrigerator 100 including one or more divided storage spaces, the storage unit 170 may store first pattern base data including action data performed by the refrigerator 100 during the learning unit period (for example, 3 weeks) and time data, which may store the pattern base data shown in FIG. 3 or 4. In one embodiment, data on whether or not the load response action has been performed for each hour may be set to 1 or 0 to constitute action data. Also, the time when the refrigerator is kept open for each hour may be accumulated to constitute time data.

The schedule generation unit 160 may generate first schedule data including the predicted action data of the refrigerator 100 and time data of the predicted action data by mapping a first learning data set to the first pattern base data related to an action of the refrigerator during a predetermined period, that is, the above-described learning unit period.

When action data stored in the pattern base data is a load response, one embodiment of the predicted action data may be data indicating the power saving mode or the normal mode. The time data of the predicted action data may be data indicating time in which driving of the above-described power saving mode or normal mode is set.

Mapping the first learning data set means that the first pattern data base may be inputted to the schedule generation unit 160 in which the first learning data set is installed to calculate schedule data.

Figure 9:
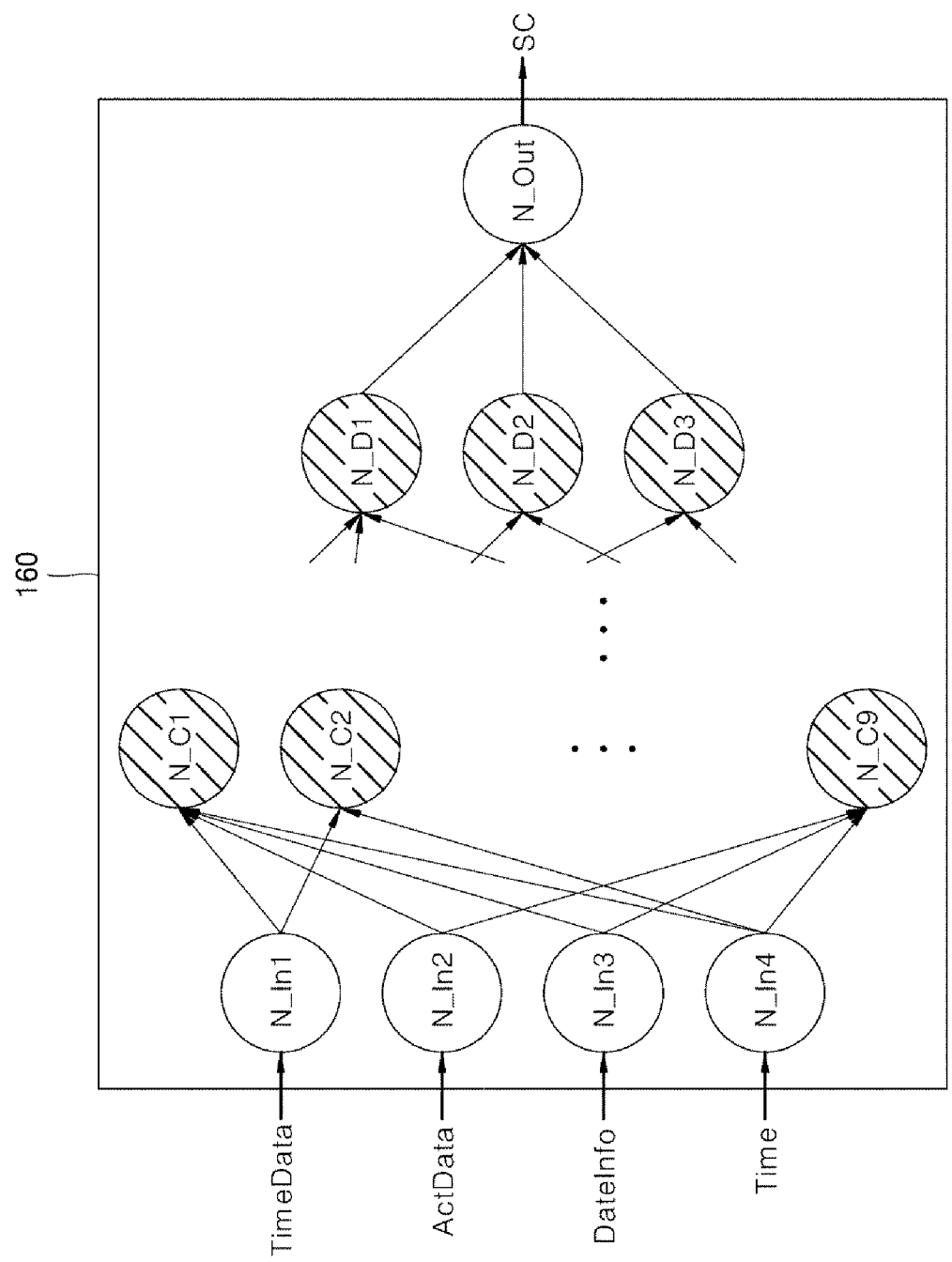
FIG. 9 is a view showing a configuration of a neural network constituting a schedule generation unit.

The first learning data set means components of a neural network as shown in FIG. 9 to be described later. In one embodiment, each of nodes may include a logic to calculate an inputted value, and a weight may be applied to links in data delivery between the nodes. In addition, a function for calculating a predetermined result with respect to the inputted value may also constitute a learning data set.

As shown in FIG. 2, the server 2000 may supply the above-described learning data set, and the communication unit 180 may receive the first learning data set from the server 2000. In addition, the server 2000 may transmit second pattern base data generated during the upload unit period so that the server 2000 generates a new learning data set.

And, the control unit 150 may control various components of the above-described refrigerator 100. In particular, the control unit 150 may generate first pattern base data and store the first pattern base data in the storage unit 170, and may control first schedule data generated by the schedule generation unit 160 to be stored in the storage unit 170. The control unit 150 may control the refrigerator 100 according to the first schedule data. When the schedule data indicates whether to operate in the power save mode or normal mode for each unit time, the control unit 150 may control the compressor 103 according to the schedule data every hour.

In addition, the control unit 150 may accumulate and store pattern base data. For example, the door sensor 102 may generate time data of the pattern base data by using the time when a door is opened. Similarly, it is possible to determine a load response action and store action data on the load response action as action data of the pattern base data by using the temperature sensor 101.

Figure 6:
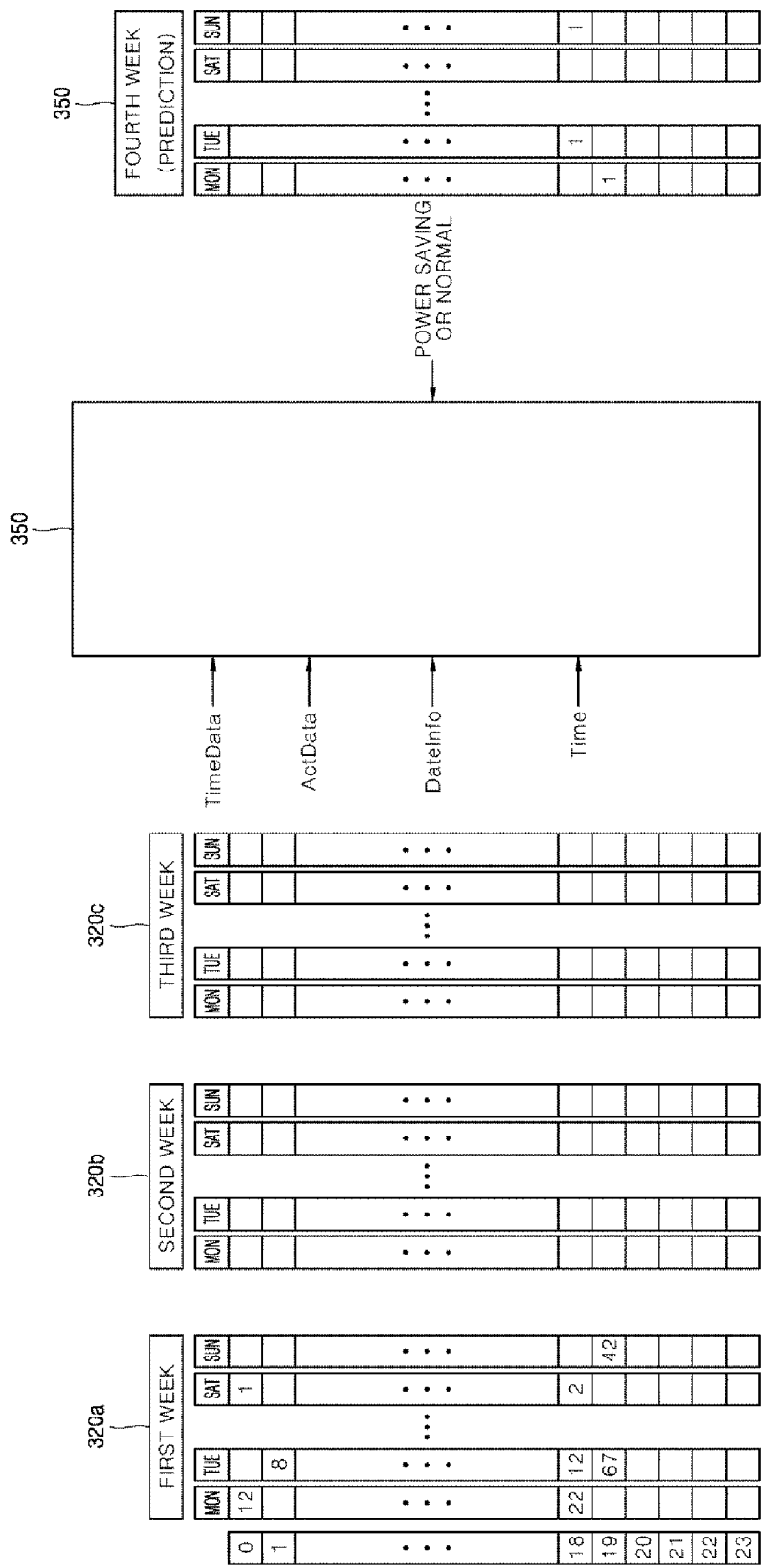
FIG. 6 is a view showing a process of schedule data being generated by a schedule generation unit of a refrigerator according to an embodiment of the present invention.

FIG. 6 is a view showing a process of generating schedule data by a schedule generation unit of a refrigerator according to an embodiment of the present invention. The pattern base data for 7 days shown in FIG. 4 may be accumulated during a learning unit period that is 3 weeks in one embodiment. The accumulated pattern base data may be 320*a*, 320*b* and 320*c*. The pattern base data may be stored in the above-described storage unit 170.

The pattern base data may be divided into predetermined units. 320*a*, 320*b* and 320*c* each may supply action data and time data of the refrigerator for one week, and may calculate schedule data 350 for the next one week based thereon.

That is, in order to calculate schedule data during a forthcoming particular period (a predicted unit period), for example, 1 week, (i.e., to calculate whether an action schedule of the refrigerator is the power saving mode or the normal mode at 0:00 that is a unit time of Monday), when data for the last 3 weeks including action data (ActData) and time data (TimeData), data specifying a day of the week (DateInfo) and time of day (0:00) at interest are inputted to the schedule generation unit 160, it is possible to calculate whether the refrigerator operates in the power saving mode or normal mode at 0:00 on the next Monday.

The foregoing data may be inputted repeatedly to the schedule generation unit 160 for each unit time and each day of the week, and schedule data for 1 week indicating a power saving mode (1) or a normal mode (0) may be generated through a result thereof.

That is, it is possible to generate schedule data for controlling a forth coming action of the refrigerator based on action data and time data relating to the same time on the same day during the learning unit period. In one embodiment, when time data is data on times when a refrigerator is opened and action data is data indicating a load response, it is possible to input a particular period (3 weeks) to a learned model as a learning unit period and predict schedule data that is operable in the next week. The learned model means a learning data set required for the schedule generation unit 160 to generate schedule data, and the learning data set may be updated through the server 2000.

In addition, the schedule data for 1 week may be newly updated according to pattern base data that is newly accumulated every day.

Figure 7:
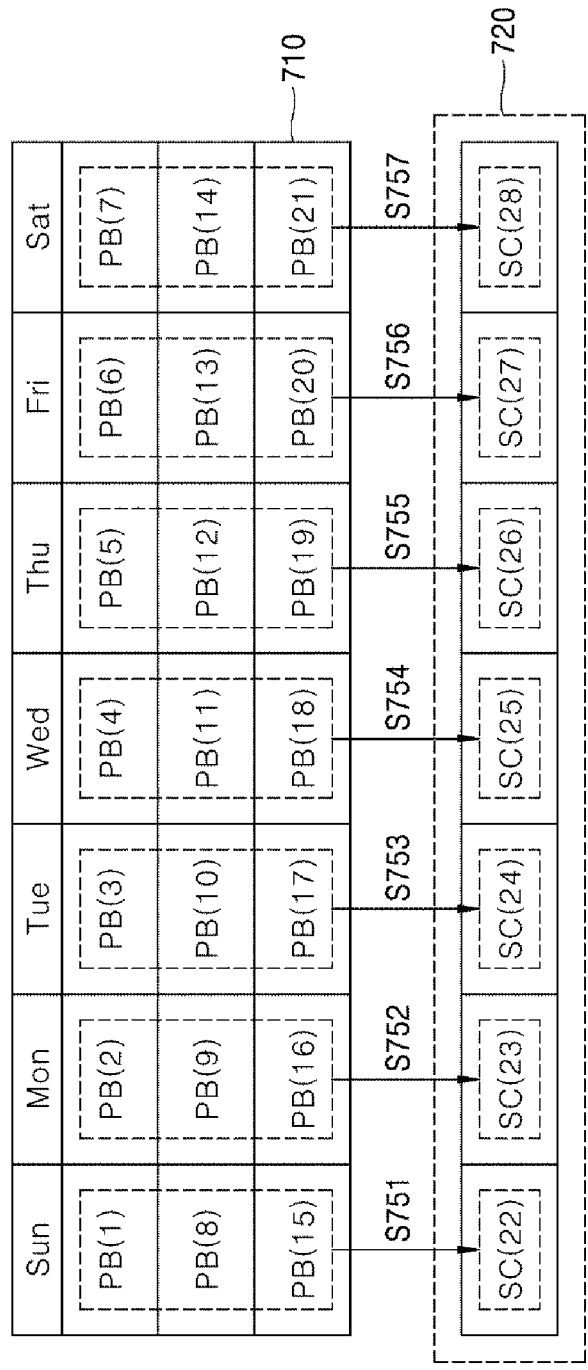
FIGS. 7 and 8 are views showing a process of updating schedule data based on pattern base data according to an embodiment of the present invention.
Figure 8:
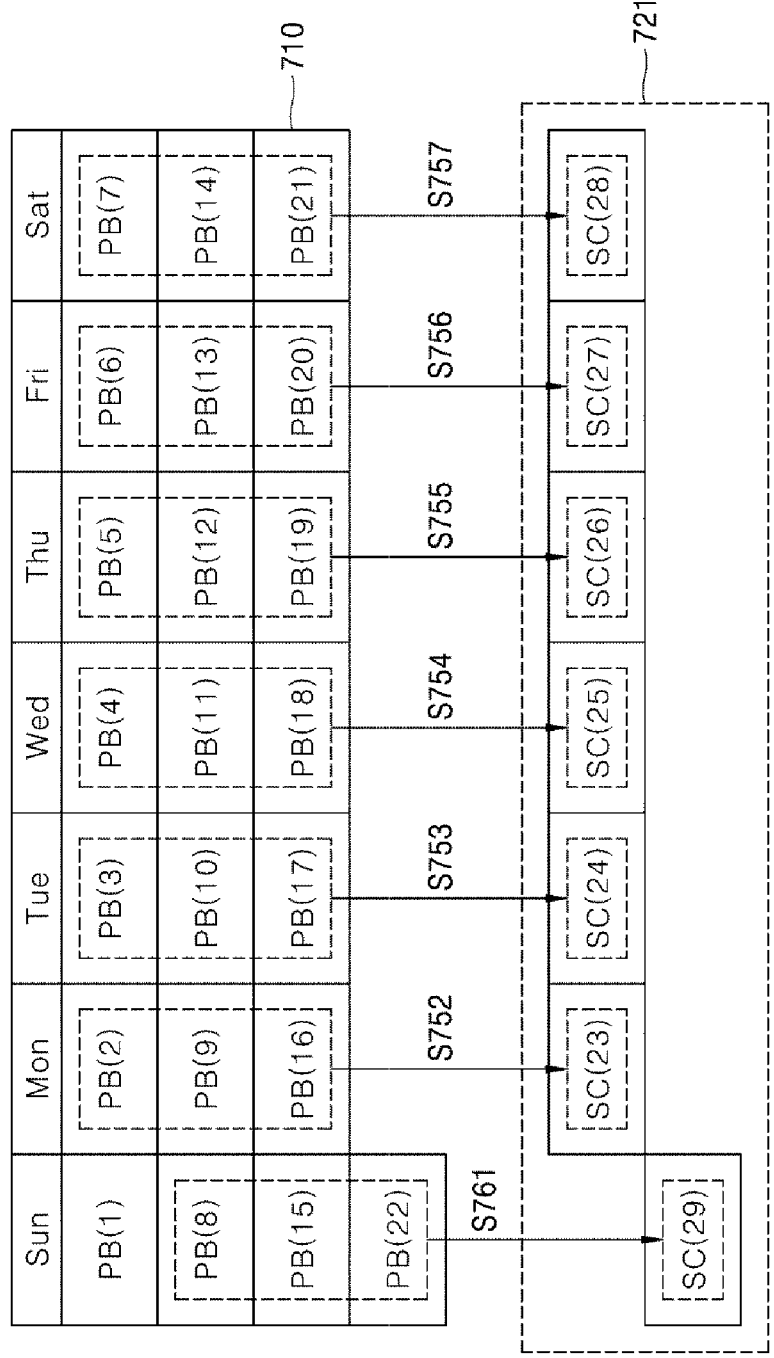

FIGS. 7 and 8 are views showing a process of updating schedule data according to pattern base data according to an embodiment of the present invention. PB means pattern base data, and SC means schedule data. Pattern base data for one day may be configured as 310 of FIG. 3. PB (5) means pattern base data at the fifth day of a particular month. The SC (26) means schedule data at the 26th day of a particular month.

In FIG. 7, schedule data may be generated based on pattern base data accumulated for the past 3 weeks as described in the configuration shown in previous FIG. 6. The same time may be applied with respect to the same day of the week. As a result, when the pattern base data on an action of a refrigerator is generated as PB(21) at 12:00 pm on the 21st day as shown in 710, schedule data for the next one week may be generated, and the schedule data may include a schedule of the refrigerator for 7 days.

SC (22) may have schedule data based on action data and time data of unit times of PB (1), PB (8) and PB (15). Parameters configured to give a weight to action data and time data of the pattern base data or required to calculate a schedule may be included in the learning data set. It is possible to calculate an average or standard deviation of data on the number of times when a refrigerator is opened in the same unit time zone based on the action data and the time data of PB (1), PB (8) and PB (15) and normalize them.

Similarly, data on whether or not the load response action of the refrigerator has been performed in the same unit time zone may be normalized, and a result thereof may be stored as an input value of the schedule generation unit 160 or may be used as an input value to a neural network classification constituting the schedule generation unit 160. As a result, SC (22), which is schedule data for 26 days, may be calculated in the same time unit.

When the unit time period is 1 hour, PB (1), PB (8) and PB (15) each may include action data and time data for the total of 24 unit time periods. The schedule generation unit 160 may calculate SC (22) as schedule data that operates on the 22nd day for 24 unit time periods from PB (1), PB (8) and PB (15). This process may be step S751. The step S751 may be a process of inputting the existing pattern data to the schedule generation unit 160 including the learning data set to calculate new schedule data.

Similarly, the schedule generation unit 160 may calculate SC (23), which is schedule data of the 23rd day, based on PB (2), PB (9) and the PB (16), as shown in step S752. The schedule generation unit 160 may calculate schedule data such as 720 by applying steps S753 to S757 for the remaining days of the week. The calculated schedule data 720 may suggest schedule data that the refrigerator operates for the next one week.

In the process of a refrigerator operating on the 22nd day based on SC (22), PB (22) reflecting an action result of an actual refrigerator may be generated. This process is shown in detail in FIG. 8.

FIG. 8 shows a state in which PB (22), which is pattern base data including a result of the operation on the 22nd day, is generated. Since the refrigerator has operated on Monday, the schedule generation unit 160 may generate SC (29), which is schedule data to operate on the 29th day, based on the new PB (22) at step S761. At this time, used pattern base data may be PB (8), PB (15) and PB (22). As a result, new schedule data 721 may be generated. Then, when PB (23), which is pattern base data including a result of the operation on the 23rd day, is generated, PB (9), PB (16) and PB (23) may be similarly applied to generate SC (30), which is new schedule data to operate on the 30th day. As a result, overall schedule data may be also updated.

When pattern base data inputted in the process of generating the previous schedule reflects pattern base data of the previous day in addition to the same day of the week, schedule data may be generated differently from 721 of FIG. 8. That is, at the moment when the PB (22) is generated, the schedule generation unit 160 may generate SC (23), which is schedule data of the 23rd day, as well as SC (29) by using PB (22) as an input value.

The schedule generation unit 160 may include a learning data set for calculating useful scheduling data from the inputted pattern base data by applying a machine learning technique, or more specifically, a deep learning technique.

FIG. 9 is a view showing a configuration of a neural network constituting a schedule generation unit. The neural network may have a predetermined network configuration of the inputted data.

Nodes including a logic required for calculation are indicated by circles in FIG. 9. The nodes may play role of converting inputted values into new values and outputting them. Also, a link as to what value is inputted with one or more of a weight and a bias may be between a node and a node.

The link is indicated by an arrow. In FIG. 9, each link may be combined with data on what weight and bias will be given to a value of a starting point (a point where there is no arrow). Thus, inputs and outputs between the nodes between the layers may calculate an output value by multiplying an inputted value by a weight, and adding or subtracting a bias.

Of course, a function corresponding to more complex arithmetic may be applied to the inputted parameter. And, this weight, bias, or function may be continuously changed during a learning process.

The above-described schedule generation unit 160 may include a plurality of nodes and a plurality of links, and the nodes and links may constitute a learning data set. Accordingly, the schedule generation unit 160 may constitute a node and a link by using a learning data set received from the server, and when predetermined pattern base data is inputted to nodes of an input end, the schedule generation unit 160 may calculate a final value (N_Out) calculated by a connection between the nodes and links based on the predetermined pattern base data, and may calculate schedule data (SC) based on the final value (N_Out).

For example, the step S751 of FIG. 7 may be applied. SC (22) may include schedule data indicating an action of a power saving mode or a normal mode for the total of 24 unit time periods. In order to calculate schedule data at 0:00 on the 22nd day, for Timedata, the schedule generation unit 160 may input time data at 0:00 (for example, the number of times when a refrigerator is opened) of PB (1), PB (8) and PB (15) to a node N_In1 as an input value.

Also, for ActData, action data at 0:00 of PB (1), PB (8) and PB (15) (for example, data on whether or not the load response action has been performed) may be inputted to a node N_In2 as an input value. Next, for Dateinfo, data indicating Sunday may be inputted to a node N_In3. For Time, "0", which is the time at interest, may be inputted to a node N_In4.

Values inputted to four input nodes N_In1 to N_In4 may be inputted to nodes N_C1 to N_C9 of a first layer with a predetermined weight. Each of the nodes N_C1 to N_C9 of the first layer may perform a predetermined calculation based on the inputted value and deliver a result of performing a predetermined calculation to nodes of the next layer. Even in this delivery process, a link between nodes between layers may also have a weight.

As a result, when the calculated values of the nodes of the previous layers are input to nodes N_D1 to N_D3 of the last layer, final values may be delivered to an output node N_Out based on the calculated values, and the output node may output schedule data, for example, data on whether to operate in a power saving mode or a normal mode at 0:00.

The plurality of nodes and links constituting the schedule generation unit 160 may be a learning data set, and these nodes and links may be received through the server 2000. The server 2000 may collect pattern data generated by the plurality of refrigerators and generate a learning data set according to a predetermined cycle.

As a result, the learning data set may grasp and predict action data of a new refrigerator on the basis of the present time, thereby more accurately generating schedule data such as the power saving mode or normal mode so that the refrigerator operates based on the schedule data. As a result, an effect of reducing energy may be enhanced.

The server may grasp and learn a pattern of driving data of a refrigerator used in each home, and may generate a deep neural network based thereon. The deep neural network may include the above-described nodes and links.

The above-described deep neural network may be provided back to the schedule generation unit 160 of the refrigerator and installed therein, and each refrigerator may input current state driving data thereof (pattern base data for the last three weeks) to the schedule generation unit 160, and may predict driving data for the next one week.

When the embodiments of the present invention are applied, time data on the number of times when the refrigerator is opened and action data on the load response action during a particular learning unit period (for example, for 3 weeks) may be acquired and configured as an input vector.

And, the time data and action data may be applied to a learning data set learned and newly generated by the server 2000, i.e., a neural network, so that a refrigerator driving state during a forthcoming particular period is scheduled. Also, as shown in FIGS. 7 and 8, after a day passes, old schedule data of the past may be discarded and updated with the newest input vector to calculate new schedule data.

Figure 10:
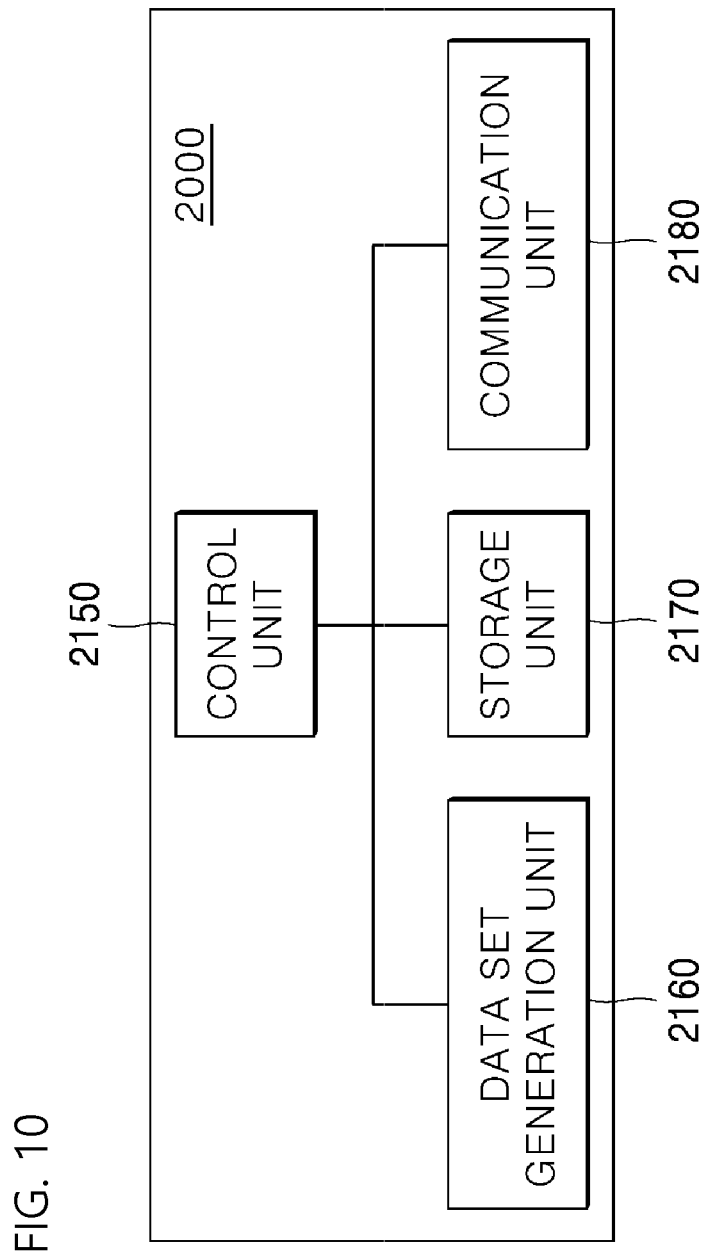
FIG. 10 is a view showing a configuration of a server according to an embodiment of the present invention.

FIG. 10 is a view showing a configuration of a server according to an embodiment of the present invention. The server 2000 may include a control unit 2150, a data set generation unit 2160, a storage unit 2170 and a communication unit 2180. The communication unit 2180 may receive pattern base data from two or more refrigerators during a learning unit period. Also, the communication unit 2180 may transmit a new learning data set generated by the data set generation unit 2160 based on the received pattern base data to the refrigerators.

The data set generation unit 2160 may generate a temporary learning data set optimized for the inputted pattern base data by receiving the pattern base data and changing all or a part of the first learning data set and generate a new learning data set by repeating a process of inputting new pattern base data and generating a temporary learning data set. The control unit 2150 may repeatedly control the above-described communication unit 2180 and data set generation unit 2160.

Figure 11:
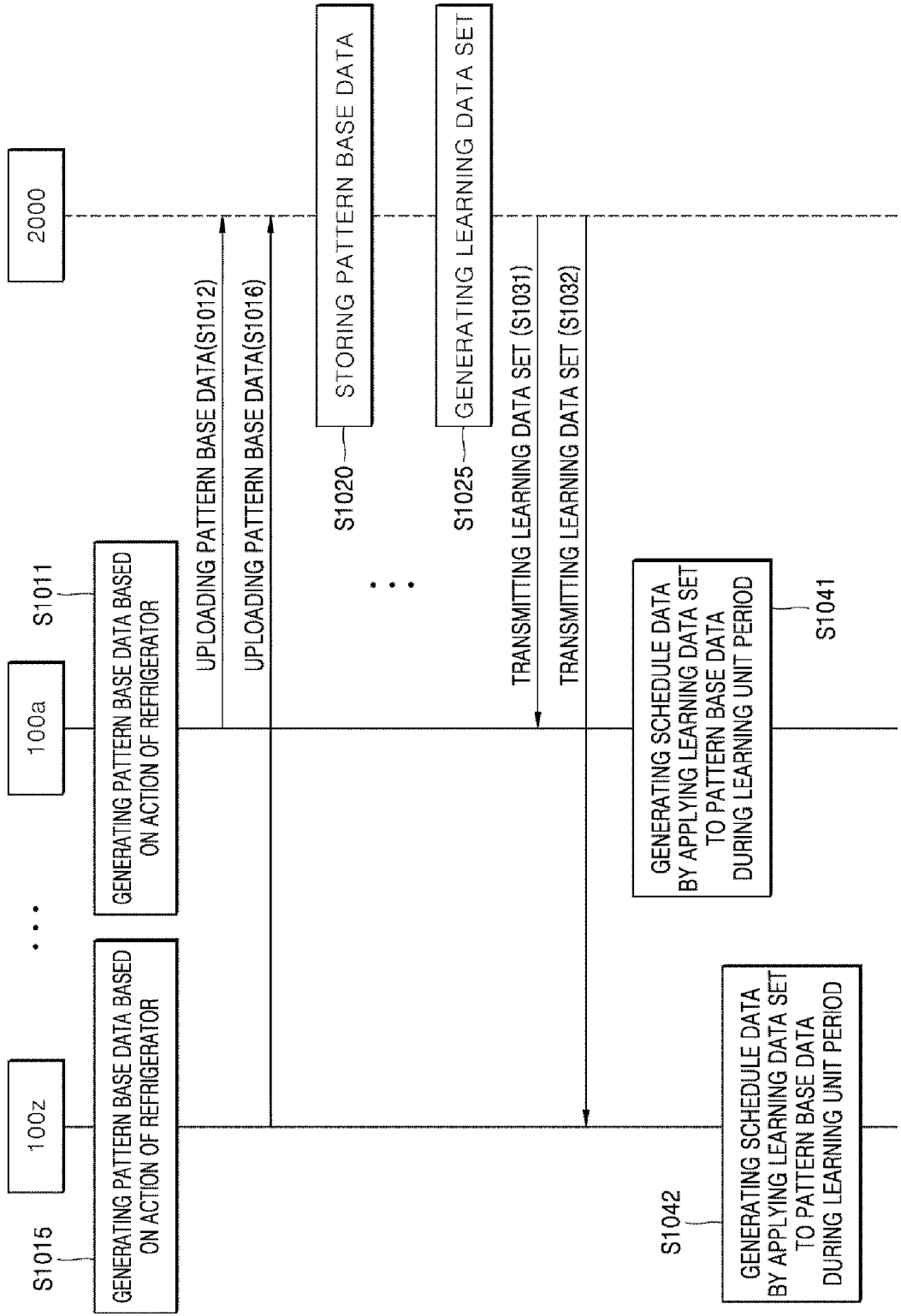
FIG. 11 is a view showing a process of transmitting and receiving pattern base data and a learning data set between a server and a refrigerator according to an embodiment of the present invention.

FIG. 11 is a view showing a process of transmitting and receiving pattern base data and a learning data set between a server and a refrigerator according to an embodiment of the present invention.

On the basis of a first or a predetermined time point, a plurality of refrigerators 100a, . . . , 100z may operate based on the existing received learning data set. Alternatively, the plurality of refrigerators 100a, . . . , 100z may operate without the learning data set. In this process, the respective refrigerators 100a, . . . , 100z may generate pattern base data according to an action of a refrigerator at steps S1011 and S1015.

And, the plurality of refrigerators 100a, . . . , 100z may upload the generated pattern base data to the server 2000 at steps S1012 and S1016. The respective refrigerators 100a, . . . , 100z may collect and upload the pattern base data within the upload unit period, and the communication unit 2180 of the server 2000 may continuously receive the pattern base data from the refrigerators 100a, . . . , 100z during a sufficient period in which the upload unit period is accumulated, i.e., the learning unit period.

When the server 2000 has received pattern base data from the refrigerators 100a, . . . , 100z for a long period as shown in FIGS. 7 and 8, the server 2000 may generate a new learning data set based on the pattern base data collected during the upload unit period. That is, the server 2000 may generate a learning data set even based on the pattern base data collected for a period shorter than the learning unit period. But, in one embodiment, the description will be made with emphasis on a case in which the pattern base data is received from the plurality of refrigerators 100a, . . . , 100z during the learning unit period.

The storage unit 2170 of the server 2000 may store the received pattern base data at step S1020. The pattern base data may be accumulated in real time and stored in the storage unit 2170. In this process, identification data of the refrigerators may not be stored.

The pattern base data stored in the storage unit 2170 of the server 2000 may be inputted to the data set generation unit 2160 by control of the control unit 2150. And, the data set generation unit 2160 may generate a temporary learning data set optimized for the inputted pattern base data by changing all or a part of the first learning data set constituting the existing data set generation unit 1160 at step S1025.

And, the data set generation unit 2160 may repeat the steps S1011 to S1025 to generate a new second learning data set. The new second learning data set may be data constituting a newly learned neural network for a predetermined period. Data of the nodes and links of FIG. 9 may be one embodiment.

Then, the communication unit 2180 of the server may transmit the second learning data set to the plurality of refrigerators 100a, . . . , 100z at steps S1031 and S1032. Then, the plurality of refrigerators 100a, . . . , 100z may generate schedule data by applying the new learning data set to the pattern base data during the learning unit period at steps S1041 and S1042. The steps S1015 to S1042 may be repeated. As a result, when a change occurs in the actions of the plurality of refrigerators, for example, when action patterns of the plurality of refrigerators change according to a seasonal factor, a temperature change and the like, the learning data set applied when the respective refrigerators generate schedule data may be changed.

The learning data set may have a multi-layered structure as shown in FIG. 9. That is, the learning data set may include one or more nodes of the first layer having an output value by using one or more values selected from the pattern base data during the learning unit period as an input value, and one or more links to which a weight between the nodes and the selected value is applied. More specifically referring to the step S1025 in this configuration, the data set generation unit 2160 may generate a temporary learning data set by adding or deleting a node or a link, and may generate a new second learning data set by repeating the above-described process.

Also, as shown in FIG. 9, an output value of a node of the first layer may be connected to an input value of a node of the second layer. For example, the learning data set may include one or more nodes of the second layer having an output value by using one or more values selected from output values of nodes of the first layer as an input value. In addition, the learning data set may include one or more links to which a weight is applied between the nodes of the first layer and the nodes of the second layer.

Figure 12:
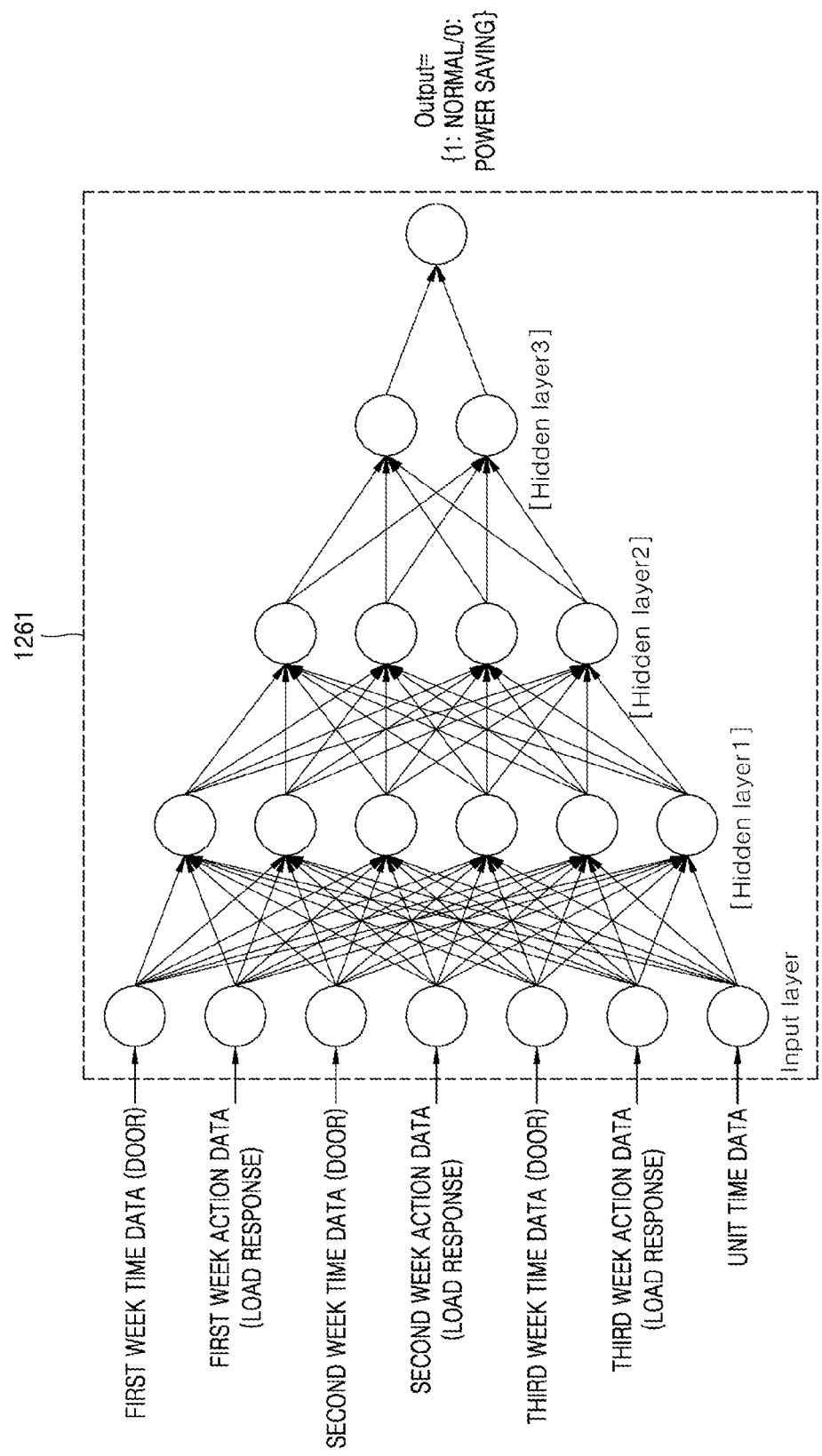
FIG. 12 is a view showing a configuration of a learning data set according to another embodiment of the present invention.

FIG. 12 is a view showing a configuration of a learning data set according to another embodiment of the present invention. 1261 shows one embodiment of the learning data set. The preceding case in which the learning unit period is three weeks and the pattern base data is based on action data such as a load response and time data such as door opening times is taken as one embodiment. In FIG. 12, the learning data set may have an input layer, three middle or hidden layers, and an output node (Output).

Respective nodes of the input layer may have a total of seven input values. Time data (door open times), action data (load response) and data of unit time points (for example, 0:00 to 23:00) for 3 weeks may be inputted. A value inputted from an input node may be converted by the input layer or may be output without conversion.

Values outputted from the input layer may optionally be input values of six nodes in a first hidden layer (Hidden layer 1). Similarly, the first hidden layer 1 may apply weights of the links to the inputted values and calculate output values according to logics of respective nodes.

The values outputted from the first hidden layer may optionally be input values of four nodes of a second hidden layer 2 (Hidden layer 2) again. Similarly, the second hidden layer 2 may apply weights of the links to the inputted values and calculate output values based on logics of respective nodes.

The values outputted from the second hidden layer may optionally be input values of two nodes of a third hidden layer (Hidden layer 3) again. Similarly, the third hidden layer may apply weights of the links to the inputted values and calculate output values based on logics of respective nodes.

Lastly, the output node (Output) may indicate schedule data (a power saving or normal/general mode). Alternatively, when a value of the output node is particular schedule data, a control unit 2150 of the server may determine whether or not the particular schedule data is correct schedule data, and may re-adjust learning data sets. That is, the nodes and links of FIG. 12 may be changed by the accumulated pattern base data.

The following is a summary of the foregoing configuration. According to one embodiment of the present invention, a learning data set generated by the server 2000 or a learning data set such as a neural network applied when the schedule generation unit 160 of a refrigerator generates a schedule may include one or more layers each including a node and a link. And, a node or a link of a learning data set may be added or changed in the process of learning a large amount of pattern base data.

For example, in Hidden layer 1, a method in which a first node gives a weight of 0.5 for data of a first week, a weight of 0.7 for data of a second week, and a weight of 1 for data of a third week nearest to the present time in respective time data and action data may be a logic implemented by one node.

Alternately, a method of selecting a particular value or outputting a particular value through conversion among a plurality of input values may be a logic implemented by a node. In addition, a weight of a link to connect an input and an output between nodes may be continuously changed during the learning process, and more accurate and optimized schedule data may be calculated in this process.

In FIG. 12, the first learning data set may be the same as 1261, but a new learning data set may be generated by removing or adding some nodes and links as a result of learning. In addition to giving a weight between the respective nodes, a bias may also be added. Thus, the inputs and outputs between the nodes between the layers may calculate an output value by multiplying the inputted value by the weight, and adding or subtracting the bias. Of course, a function corresponding to more complex arithmetic may be applied to the inputted parameter. And, this weight, bias, or function may be continuously changed during the learning process.

Figure 13:
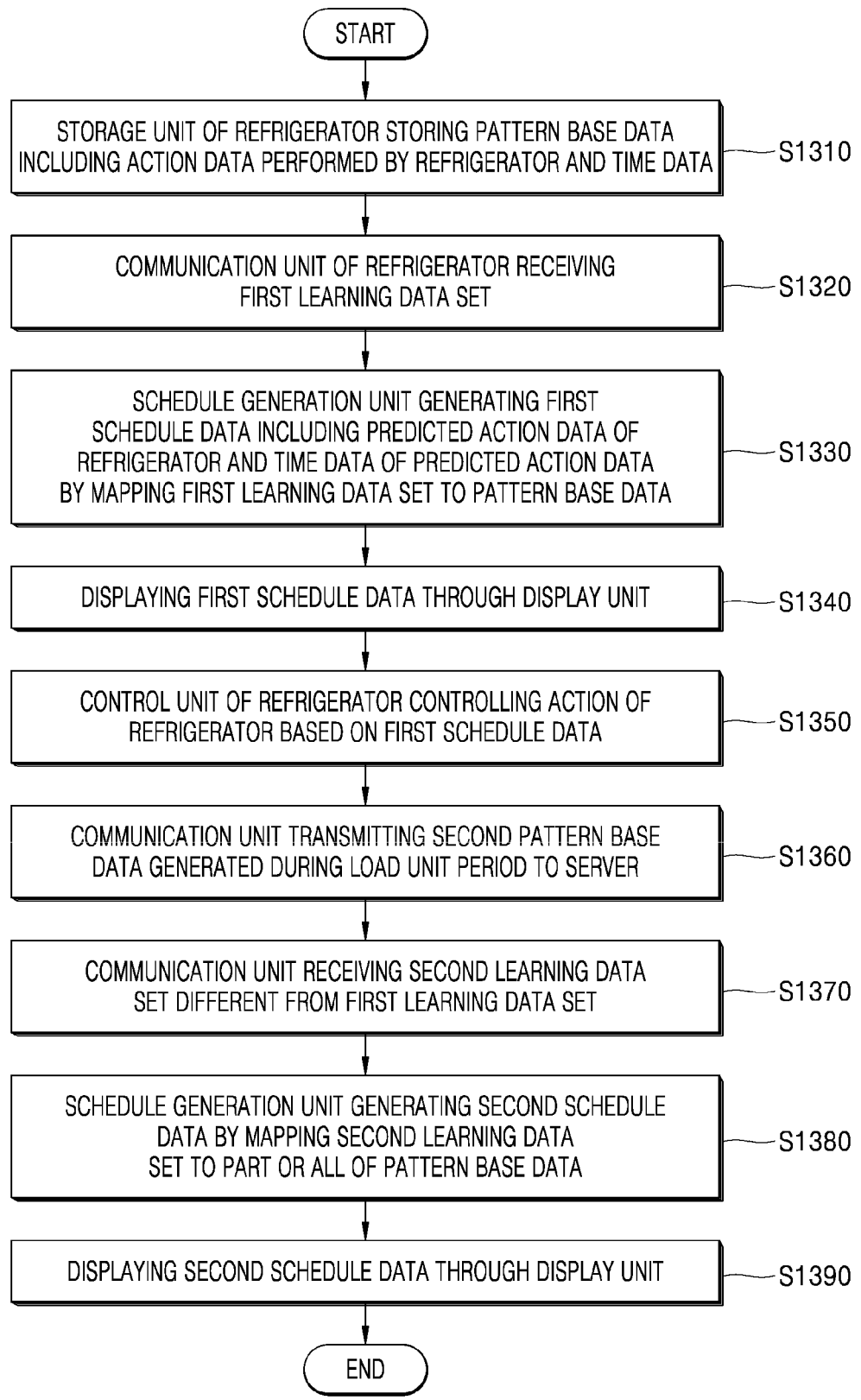
FIG. 13 is a view showing a process in which a refrigerator newly receive a learning data set, generates new schedule data by applying the learning data set, and displays the new schedule data to the outside according to an embodiment of the present invention.

FIG. 13 is a view showing a process in which a refrigerator newly receive a learning data set, generates new schedule data by applying the learning data set, and displays the new schedule data to the outside according to an embodiment of the present invention.

The storage unit 170 of the refrigerator 100 may store pattern base data including action data performed by the refrigerator 100 and time data at step S1310. And, the communication unit 180 of the refrigerator 100 may receive the first learning data set from the server 2000 at step S1320. The foregoing steps have been described in connection with the steps S1031 and S1032 of FIG. 11.

The schedule generation unit 160 may generate first schedule data including the predicted action data of the refrigerator 100 and time data of the predicted action data by mapping the first learning data set to the pattern base data at step S1330. And, the control unit 150 may output the first schedule data through the display unit 110 at step S1340.

For example, it means that the refrigerator 100 may operate in the power saving mode for the next week. And, the control unit 150 of the refrigerator 100 may control an action of the refrigerator 100 based on the first schedule data at step S1350. More specifically, when the schedule data indicates to the power saving mode or normal mode, the control unit 150 may control the compressor 103 of the refrigerator 100 to operate in the power saving mode or normal mode.

Then, the communication unit 180 may transmit the second pattern base data generated during the upload unit period among the previously stored pattern base data to the server 2000 at step S1360. And, the communication unit 180 may receive the second learning data set different from the previously stored first learning data set from the server 2000 at step S1370. As a result, the control unit 150 and the schedule generation unit 160 of the refrigerator 100 receiving the new learning data set may generate second schedule data by mapping the second learning data set to a part or all of the pattern base data at step S1380.

The foregoing configuration may be applied to all or a part of the previous pattern base data. The pattern base data may be accumulated continuously, and thus it means that only a part of the pattern base data previously applied to generate the first schedule data may be applied to generate the second schedule data.

The control unit 150 may output the new second schedule data through the display unit 110 at step S1390. In this process, a portion where a difference occurs between the first schedule data and the second schedule data may be highlighted or the schedule data may be outputted through the display unit 110 so that the portion is easily identified.

FIG. 13 shows that the communication unit 180 of the refrigerator may receive the first learning data set from the server at the step 1320. However, according to another embodiment, the first learning data set may be installed in the refrigerator in advance. That is, the first learning data set generated by the server through the learning process may be installed in the schedule generator 160 of the refrigerator in advance. And, the schedule generation unit 160 may generate schedule data as a result of applying the first learning data set based on the pattern base data generated by the refrigerator during the operation. In a state in which the first learning data set is basically installed, the schedule generation unit 160 may generate schedule data based on the installed first learning data set until a new learning data set is received.

When the refrigerator does not perform a separate action from the server, a configuration of the refrigerator is as follows.

The storage unit 170 may store the first pattern base data including action data performed by the refrigerator during the learning unit period and time data. And, the schedule generation unit 160 may generate first schedule data including predicted action data of the refrigerator and time data of the predicted action data by mapping the first learning data set to the first pattern base data. Also, the control unit 150 may generate first pattern base data and store the first pattern base data in the storage unit 170, and may store the first schedule data generated by the schedule generation unit 160 in the storage unit 170. And, the control unit 150 may control the refrigerator according to the first schedule data.

At this time, even when the same first learning data set is used as it is, it is confirmed in FIGS. 7 and 8 that the schedule data may be generated differently depending on the pattern base data. That is, even when there is no upgrade or change of the learning data set, the pattern base data reflecting the action of the refrigerator may be continuously accumulated and changed, and thus the schedule generation unit 160 may generate new schedule data by mapping the same first learning data set to a part or all of the patter base data, which means that the schedule data may be continuously changed and generated depending on a usage form of the refrigerator.

The steps S1340 and S1380 of displaying the schedule data of FIG. 13 through the display unit 110 may include transmitting the schedule data to an external mobile device such as a smart phone by using the communication unit 180. As a result, even outside, a user may confirm that the schedule data displayed on the mobile device is changed. Of course, a change of the schedule data may reflect a result that schedule data is newly generated by the schedule generation unit 160 of the refrigerator due to accumulation of pattern base information being changed or the learning data set being changed.

In summary, the refrigerator 100 may calculate schedule data from pattern base data in which a usage pattern of the refrigerator is recorded by means of a pre-installed learning data set or a learning data set received from the server 2000. When new pattern base data is generated, the refrigerator may calculate new schedule data by reflecting the new pattern base data again.

When the communication unit 180 of the refrigerator 100 is not always connected to the server 2000, a new learning data set generated from the server 2000 may be installed in the schedule generation unit 160 of the refrigerator 100 by a non-communicative process or a short-range communication process.

For example, when the smart phone is ready to receive a learning data set from the server 2000, the smart phone may receive a new learning data set. And, the smart phone and the refrigerator may be installed in the schedule generation unit 160 of the refrigerator 100 by means of a short-range communication method (for example, Bluetooth).

Also, in another embodiment, a memory module with the learning data set of the server 2000 stored therein may be inserted into the refrigerator 100, and the control unit 150 of the refrigerator 100 may read the learning data set stored in the inserted memory module, and may install the learning data set in the schedule generation unit 160.

In this case, the refrigerator 100 may not upload the pattern base data to the server 2000, but the new learning data set learned based on pattern base data uploaded by the other refrigerators may be installed in the schedule generation unit 160 in the above-described manner. When there are many other refrigerators and pattern base data thereof is sufficiently provided to the server 2000, a new learning data set may be generated based on learning.

In particular, even when the schedule generation unit 160 of the refrigerator is provided and the communication unit 180 is not provided, the learning data set may be installed in the schedule generation unit 160 in advance, or the new learning data set may be installed in the schedule generation unit 160 in the above-described manner.

Figure 14:
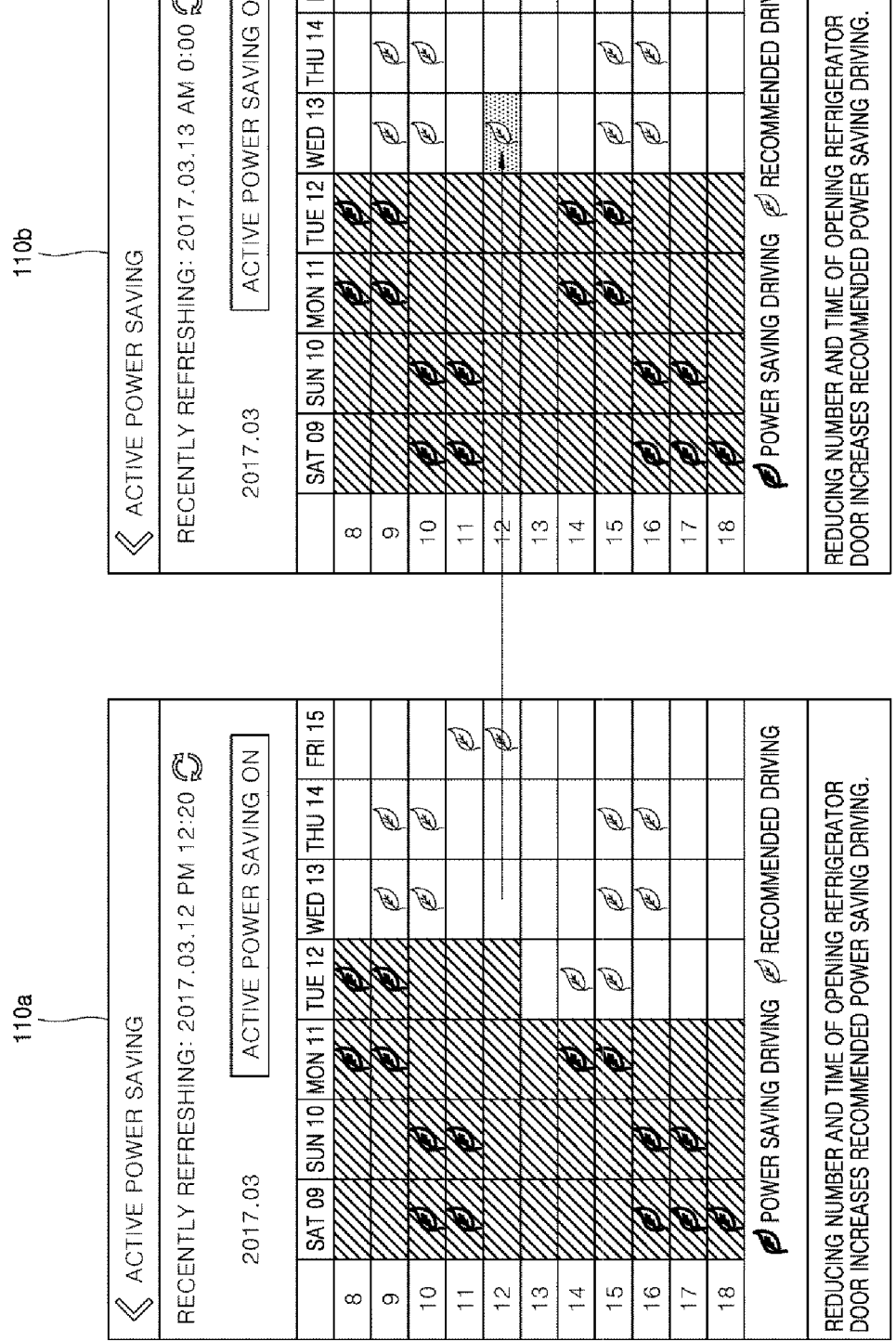
FIG. 14 is a view showing a display unit that displays changed schedule data according to an embodiment of the present invention.

FIG. 14 is a view showing a display unit that displays changed schedule data according to an embodiment of the present invention. A first screen 110a of the display unit shows a situation of the refrigerator driven in a power saving mode recommended based on the first schedule data and a previous power saving mode as a situation of 12:20 pm on Mar. 12, 2017. The refrigerator receiving a second running data set at midnight on Mar. 12, 2017 may newly generate second schedule data and output the second schedule data as shown in 110b. Here, it can be seen that, in 110b, a mode of the refrigerator may be changed to a power saving mode according to the second schedule data although the original mode of the refrigerator was not power saving mode at 12:00 pm on Wednesday. By allowing such a change of the mode to be displayed in a highlighted manner, the user may confirm that the power saving mode has been added or changed based on the changed schedule data.

Of course, new schedule data may be also calculated based on the same first learning data set, which may be also displayed as shown in FIG. 14.

Display screens 110a and 110b of FIG. 14 may be also confirmed in a portable type digital device such as a smart phone interlocked with the communication unit 180 of the refrigerator. Even when the user is at a remote distance from the refrigerator, the user may confirm the schedule data being changed and applied in real time based on data displayed on the smart phone.

The new schedule data may be schedule data for a predetermined prediction unit period. That is, a prediction unit period of the first schedule data between March 1 and March 7 may be March 1 to March 7.

However, when a new learning data set is received at midnight on March 1 and the schedule generation unit 160 generates new second schedule data by applying the new learning data set, a prediction unit period thereof may be March 2 to March 8.

That is, the schedule data may be schedule data within a prediction unit period to which the schedule data is applied, and a prediction unit period of the first schedule data and a prediction unit period of the second schedule data may be configured to be different from each other.

Also, even through a new learning data set is not received, when the schedule generation unit 160 generates new second schedule data by applying the newly accumulated pattern base data, a prediction unit period thereof may be also March 2 to March 8, which is shown in FIG. 8.

Figure 15:
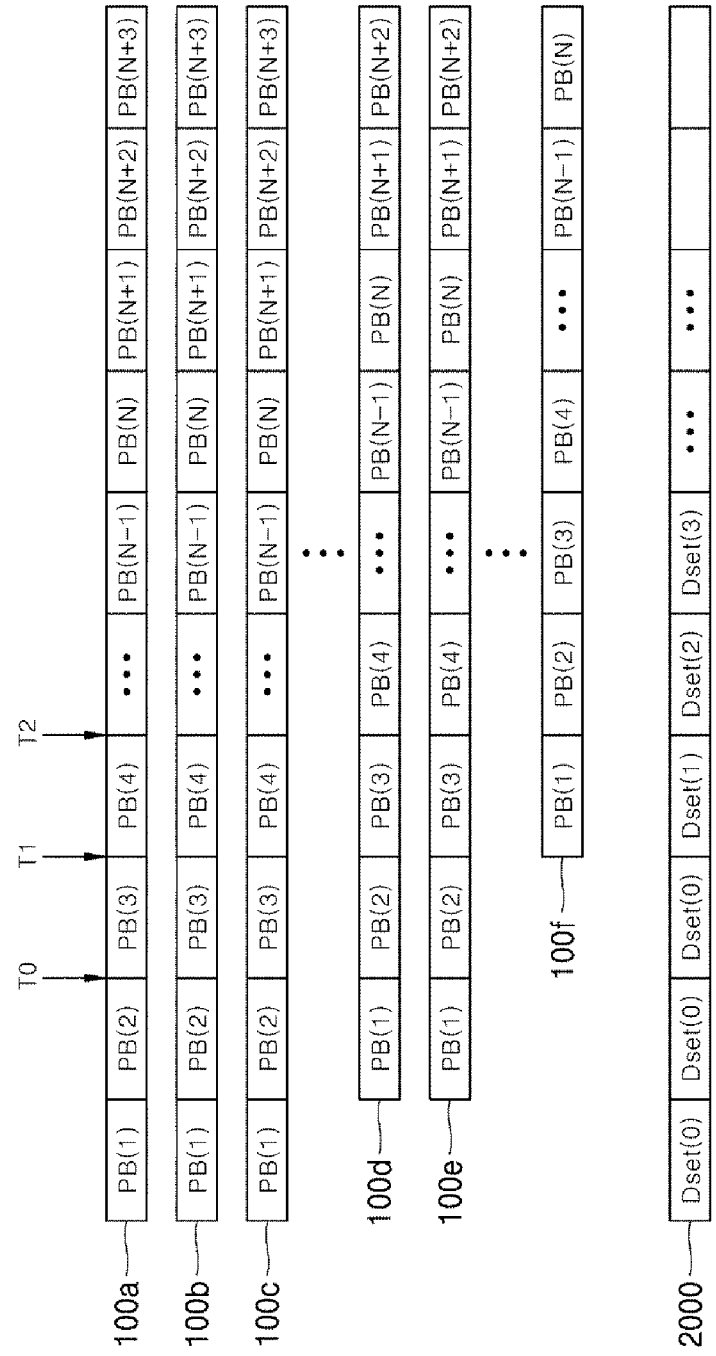
FIG. 15 is a view showing a pattern base of a refrigerator and schedule data that is generated based thereon.

FIG. 15 is a view showing pattern base data of a refrigerator and schedule data that is generated based thereon. Hereinafter, a state of pattern base data stored in each refrigerator is linked to a relevant refrigerator and displayed.

Each refrigerator 100a to 100f may generate pattern base data from a time point when the refrigerator is installed and used. Pattern base data generated by 100a, 100b and 100c may be stored first, followed by 100d, 100e, and then 100f.

Here, referring to a first group (100a, 100b and 100c), pattern base data indicated by respectively generated PB (1) to PB (K) (K is a natural number equal to or greater than 1) may be transmitted to the server. The learning data set may be generated by the pattern base data received from the server and transmitted to the respective refrigerators 100a to 100f. The refrigerators indicated by 100d, 100e, and 100f, in which the pattern base data is not sufficiently accumulated, may also receive the learning data set, and may apply the learning data set to drive the refrigerator.

In addition, the server 2000 may distribute a originally set learning data set Dset (0) to the refrigerators at a time point when the refrigerators fail to generate sufficient pattern base data (before T0), and thus the refrigerators may generate schedule data based on the initial learning data set Dset (0).

It is assumed that K, which is a learning unit period, is 3. When K is 3, the server 2000 may learn based on PB (1) to PB (3) of the first group (100a, 100b and 100c). Of course, in this process, PB (1) and PB (2) of a second group (100d and 100e) may be also transmitted to the server 2000 at a time point T1.

A learning data set generated by learning the pattern base data of the refrigerators at the time point of T1 may be Dset (1), and Dset (1) may be transmitted to the refrigerators 100a to 100e and installed in each schedule generation unit 160. 100f may not receive the learning data set because it is not yet in operation. According to settings, the refrigerators 100a to 100e may input previous pattern base data on the basis of T1 in relation to generating schedule data.

The first group (100a, 100b and 100c) may calculate schedule data suitable for each refrigerator by using PB (1) to PB (3) as an input value to Dset (1) which is a previously received learning data set.

The second group (100d and 100e) may calculate schedule data suitable for each refrigerator by using PB (1) and PB (2) as an input value to Dset (1) which is a previously received learning data set.

Then, in the process of operation, the refrigerators 100a to 100f may upload the pattern base data generated at the time point T1 and a time point T2 to the server 2000. T1 and T2, which are an upload unit time points, may be set in various ways.

In more detail, the first group (100a, 100b0 and 100c) may upload PB (4) to the server 2000, the second group (100d and 100e) may upload PB (3) to the server 2000, and 100f may upload PB (1) to the server 2000. As a result, the server 2000 may generate Dset (2) which is a new learning data set at the time point T2 and transmit Dset (2) to the refrigerators 100a to 100f.

The first group (100a, 100b and 100c) may calculate schedule data suitable for each refrigerator by using PB (2) to PB (4) as an input value to Dset (2) which is a previously received learning data set.

The second group (100d and 100e) may calculate schedule data suitable for each refrigerator by using PB (1) to PB (3) as an input value to Dset (2) which is a previously received learning data set.

A third group (100f) may calculate schedule data suitable for each refrigerator by using PB (1) as an input value to Dset (2) which is a previously received learning data set.

Therefore, the refrigerators may receive a new learning data set according to a result learned by uploading the pattern base data to the server 2000, and may install the new learning data set in the schedule generation unit 160 to calculate more suitable schedule data.

The server 2000 may receive the new learning data set by using the continuously uploaded pattern base data. In particular, the server 2000 may dynamically adapt the refrigerator operation scheduling to situations in which the usage pattern of the refrigerator varies depending on a seasonal influence, an environmental factor, and the like in a particular region, and may configure the situation as a learning data set.

Further, when the present invention is applied, it is possible to overcome the limited learning based on limited pattern base data of an individual refrigerator. In addition, a newly installed refrigerator may also install a learning data set generated based on usage patterns of the previously installed other refrigerators, and thus it is possible to configure schedule data suitable for a usage pattern more quickly.

The following is a summary of the foregoing configuration. The communication unit 180 of the refrigerator may receive the second learning data set different from the first learning data set from the server, and the schedule generation unit 160 may generate new schedule data by mapping the second learning data set to a part or all of the pattern base data, which means that the schedule generation unit 160 newly generates a schedule because the learning data set has been changed. In this process, the existing pattern base data may be directly inputted to the schedule generation unit 160, and the existing pattern base data to which the newly accumulated pattern base information is added may be inputted.

When new pattern base data is generated without receiving the new learning data set, the new pattern base data may be inputted to the schedule generation unit 160, and the schedule generation unit 160 may generate new schedule data.

In one embodiment, the storage unit 170 of the refrigerator may store the first pattern base data of the learning unit period and the second pattern base data after the learning unit period.

The control unit may generate new schedule data including predicted action data of the refrigerator and time data of the predicted action data by mapping the first learning data set to a part of the first pattern base data and the second pattern base data after a predetermined period has elapsed, which means that, when the new learning data set is not received, newly generated pattern base data (second pattern base data) may be inputted to the same learning data set to calculate new schedule data.

Figure 16:
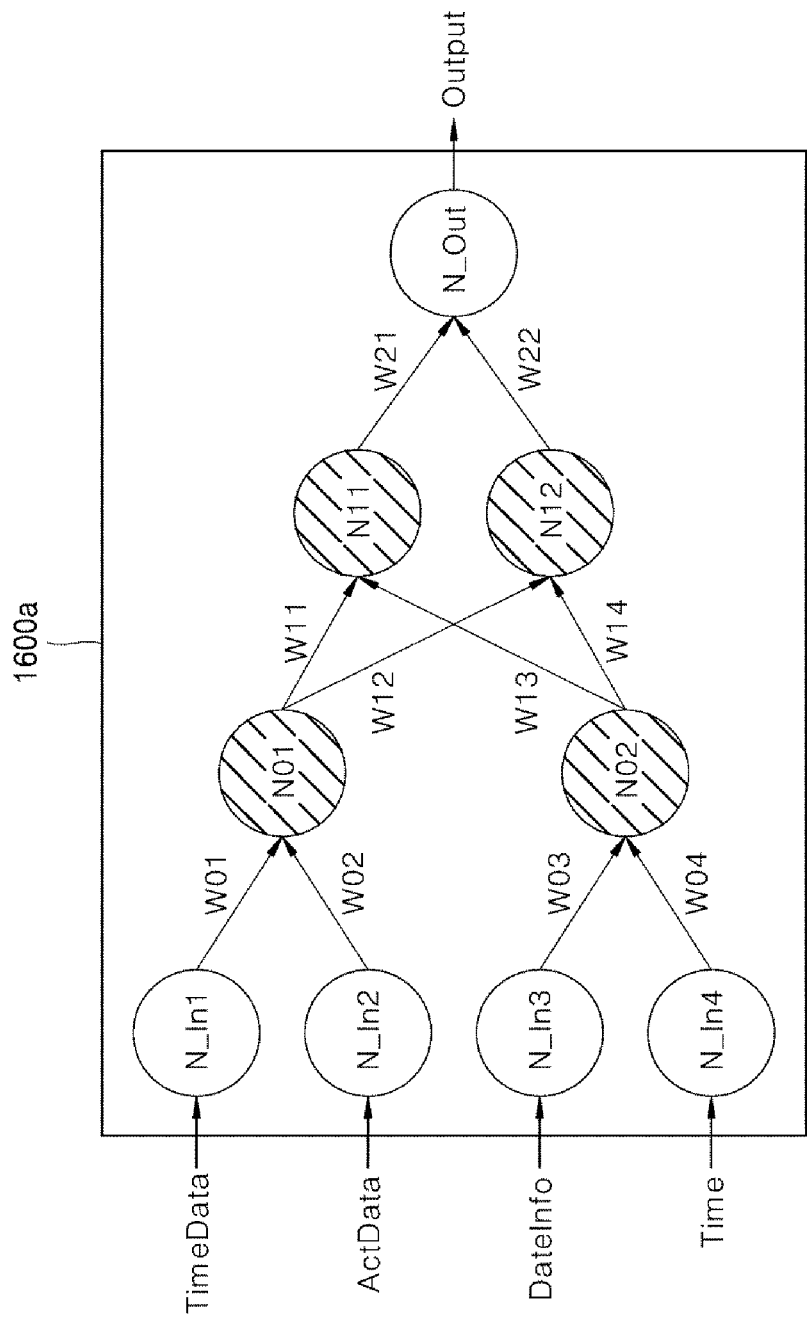
FIGS. 16 and 17 are views showing a configuration of a network for generating a learning data set in a server.
Figure 17:
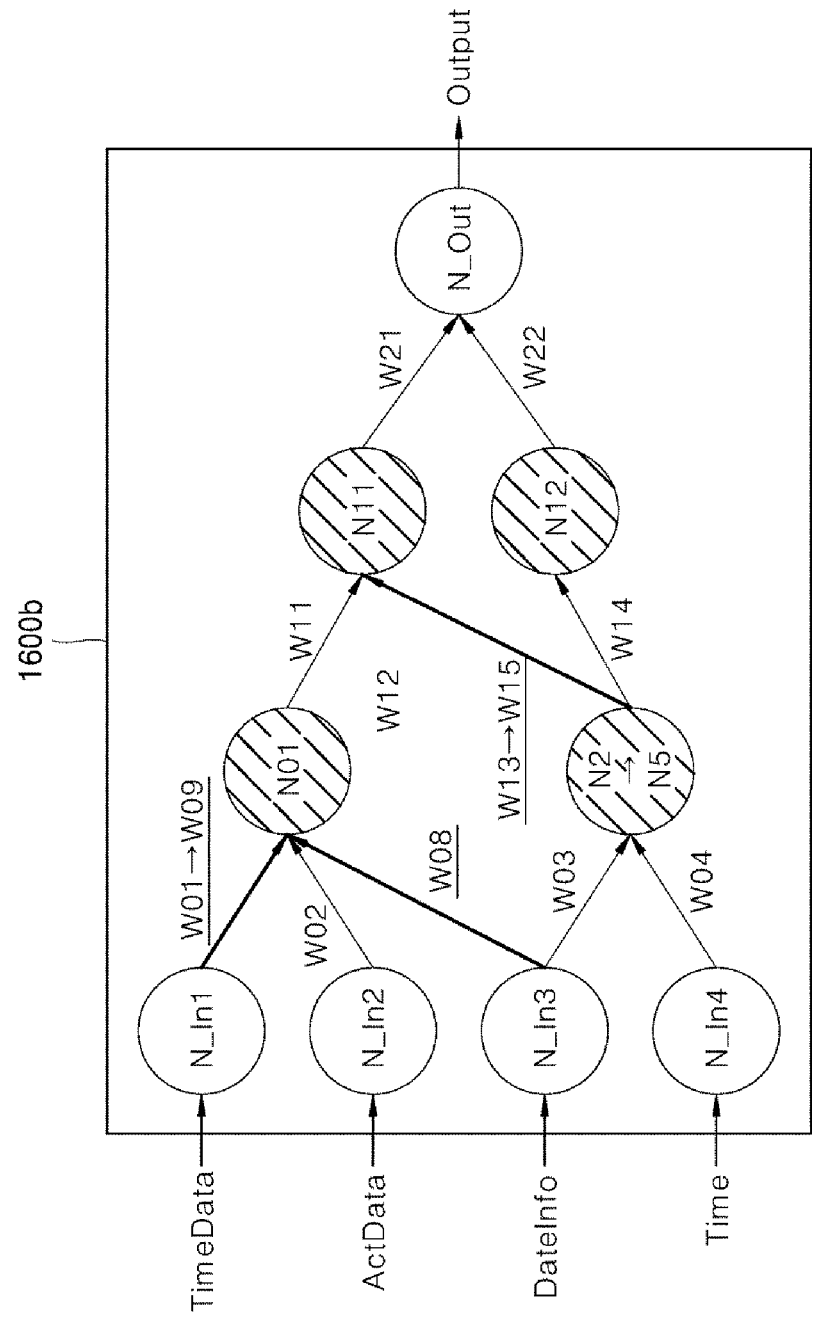

FIGS. 16 and 17 are views showing a configuration of a network for generating a learning data set in a server. 1600a and 1600b each show a learning data set that the server 2000 retains. In FIGS. 16 and 17, W means a weight of a link. Each character written in a node means a logic of the node identifying the node. Therefore, a change of the characters written in the node means a change of the logic.

As shown in FIG. 15, the pattern base data received from the plurality of refrigerators may be sequentially inputted to the input nodes N_In1 to N_In4 of a first learning data set 1600a. An inputted value, an output value resulting therefrom, and accuracy of a case in which the output value is applied to an actual schedule may be calculated. When the accuracy is below a predetermined level, weights of respective links W01 to W22 and logics of nodes may be changed. In the changed process, a new node may be added, a weight may be changed, or a link may be generated or removed. Alternatively, nodes of a new layer may be added. A result thereof will be described with reference to FIG. 17.

FIG. 17 is an example in which particular nodes and links are changed in the process of learning the learning data set 1600a of FIG. 16. First, a weight of a link inputted from N_In1 to N01 may be changed from W01 to W09. And, a new link inputted from N_In3 to N01 may be added with a weight of W08.

A logic of a node may be also changed. For example, a logic to find an average from a value to which a node N02 is inputted may be changed to N05 including a logic to find an intermediate value.

An existing link may be removed. A link between N01 and N12 (a weight is W12) existing in 1600a is removed from 1600b. In addition, it can be seen that a weight of a link having a weight of W13 inputted from N02 to N11 is changed to W15. After changing the learning data set as shown in 1600b, the learning process may be performed by comparing and continuing the accuracy of the output value to change the link and node of the learning data set.

The learning data set 1600b of FIG. 17 may be a temporary learning data set. Alternatively, the learning data set 1600b of FIG. 17 may be a new learning data set calculated by repeatedly learning. When a new learning data set is determined as a result of repeated learning, the learning data set may be transmitted to the refrigerators, and the refrigerators each may install the learning data set in the schedule generation unit 160. And, until another learning data set is received, the refrigerators each may input previous pattern base data to the schedule generation unit 160 to calculate schedule data.

The following is a summary of the learning data set. The learning data set may include one or more nodes of a first layer having an output value by using one or more values selected from pattern base data that is accumulated during the learning unit period and provided by the plurality of refrigerators. And, the learning data set may include one or more links to which a weight between a node and a selected value is applied.

As shown in FIG. 17, a data set generation unit 2160 of the server 2000 may generate a temporary learning data set by adding or deleting a node or a link.

And, the learning data set may have a multi-layer structure. The learning data set may further include one or more nodes of the second layer having an output value by using one or more values selected from output values of nodes of the first layer as input values, and one or more links to which a weight is applied between the nodes of the first layer and the nodes of the second layer.

The data set generation unit 2160 of the server 2000 may increase or decrease the number of nodes and links of a learning data set in which learning is first started, and may also add or remove a layer. FIGS. 16 and 17 are illustrated based on a weight but, as described above, a bias may be also applied. That is, with respect to an inputted value, multiplying by a weight, adding a bias, or applying a function may be also applied to both FIGS. 16 and 17, and a change of a function in addition to a change of a weight and a bias may be also applied to embodiments of the present invention.

FIG. 18 is a view showing experimental results that satisfy normality when an embodiment of the present invention is applied. Before the learning data set of the present invention is applied, an existing driving method (existing active power saving) of a power saving mode shows a result ($P<0.005$) of being out of the normality (refer to 1810). More specifically referring to the graph of 1810, an average is 85.14; a standard deviation is 8.178; N has a value of 76; and, AD has a value of 1.982.

Conversely, a driving method of a power saving mode based on schedule data to which the learning data set is applied as shown in 1820 shows a result that satisfies the normality ($P: 0.145$).

The foregoing configuration means that, when the learning data set learned by means of pattern base data accumulatively generated by all refrigerators is installed in the schedule generation unit, accuracy of schedule data calculated by the schedule generation unit may be more improved. More specifically referring to the graph of 1820, an average is 85.96; a standard deviation is 7.217; N has a value of 76; and, AD has a value of 0.0557. When comparing 1820 to 1810, it can be seen that points in 1820 are disposed more closely to a straight line.

When the present invention is applied, a learning data set calculated based on a large amount of pattern base data provided by the plurality of refrigerators may be applied to generate schedule data. As a result, even when the refrigerator temporarily performs an action out of a pattern, the power saving mode and normal mode action of the refrigerator may be more accurately predicted because the schedule data is generated based on the pattern base data accumulated in the past. In addition, a large amount of pattern base data provided by many refrigerators may reflect a seasonal change, a temperature change, a social change and the like, thereby generating more accurate schedule data.

In particular, pattern base data to be inputted to a learning running data set required for generating schedule data may be individual data generated by each refrigerator, and thus schedule data optimized for each refrigerator may be calculated.

Further, when the present invention is applied, the schedule generation unit 160 of the refrigerator may newly generate schedule data by applying pattern base data newly generated according to an action pattern of the refrigerator. In addition, the schedule generation unit 160 of the refrigerator may install a learning data set newly generated based on action patterns of the other refrigerators, and then, may generate new schedule data based on pattern base information newly generated based on an action pattern of the relevant refrigerator and the new learning data set.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by a person skilled in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium. Also, a computer program to implement an embodiment of the present invention may include a program module that is transmitted in real time via an external device.

The present invention is described with reference to embodiments described herein and accompanying drawings, but is not limited thereto. It should be apparent to those skilled in the art that various changes or modifications which are not exemplified herein but are still within the spirit and scope of the present disclosure may be made.

DESCRIPTION OF SYMBOLS

100: Refrigerator 101: Temperature sensor
102: Door sensor 103: Compressor
110: Display unit 150: Control unit
160: Schedule generation unit 170: Storage unit
180: Communication unit 320, 710: Pattern base data
350, 720, 721: Schedule data
1261, 1600*a*, 1600*b*: Learning data set
2000: Server

What is claimed:

1. A method for generating operation schedule data for a refrigerator, the method comprising:

storing, in a storage unit of the refrigerator, first usage pattern base data generated during a learning unit period, the first usage pattern base data including operation data performed during the learning unit period by the refrigerator or a user, and time data corresponding to the operation data;

receiving, by a communication unit of the refrigerator, a first learning data set from a server;

generating first operation schedule data for controlling a forthcoming action of the refrigerator for a first prediction unit period that is shorter than the learning unit period, the first operation schedule data including first predicted usage data related to the operation data performed in corresponding times during the learning unit period, and first predicted time data corresponding to the first predicted usage data, wherein generating the first operation schedule data comprises mapping the first learning data set to the first usage pattern base data; and controlling, by a control unit of the refrigerator, operation of the refrigerator based on the first operation schedule data, wherein the operation data comprise at least one of:
 data representing one or more operation modes performed by the refrigerator, or
 data representing whether or not the refrigerator has performed a load response, wherein the time data comprise at least one of:
 data representing a number of times in which a door of the refrigerator has been opened or closed within a unit time period, or
 data representing a number of times in which the refrigerator has operated according to an operation mode among the one or more operation modes within the unit time period, and wherein the method further comprises:
 accumulating the time data based on (i) the number of times in which the door of the refrigerator has been opened or closed within the unit time period or (ii) the number of times in which the refrigerator has operated according to the operation mode within the unit time period, and
 based on a number of an accumulated time data for the unit time period being greater than a predetermined value that represents a frequency of accumulating data, applying a weight to the accumulated time data.

2. The method of claim 1, further comprising:
transmitting, by the communication unit, second usage pattern base data generated during an upload unit period to the server.

3. The method of claim 1, further comprising:
receiving, by the communication unit, a second learning data set different from the first learning data set from the server; and
generating second operation schedule data during a second prediction unit period, wherein generating the second operation schedule data comprises mapping the second learning data set to at least a part of the first usage pattern base data.

4. The method of claim 3, wherein the first prediction unit period of the first operation schedule data and the second prediction unit period of the second operation schedule data are different from each other.

5. The method of claim 1, further comprising:
storing, in the storage unit, the first usage pattern base data generated during the learning unit period and second usage pattern base data generated after the learning unit period; and
generating third operation schedule data that includes second predicted operation data of the refrigerator and second predicted time data corresponding to the second predicted operation data, wherein generating the third operation schedule data comprises:
 mapping the first learning data set to a part of the first usage pattern base data, and
 mapping the first learning data set to a part of the second usage pattern base data based on mapping the first learning data set to the part of the first usage pattern base data.

6. A refrigerator configured to generate operation schedule data, the refrigerator comprising:
a storage unit configured to store first usage pattern base data generated during a learning unit period, the first usage pattern base data including operation data performed during the learning unit period by the refrigerator or a user, and time data corresponding to the operation data;
a communication unit configured to receive first learning data set from a server and to transmit second usage pattern base data generated during an upload unit period to the server; and
a control unit configured to:
 generate the first usage pattern base data,
 based on mapping the first learning data set to the first usage pattern base data, generate first operation schedule data for controlling a forthcoming action of the refrigerator for a first prediction unit period that is shorter than the learning unit period, the first operation schedule data including first predicted operation data related to the operation data performed in corresponding times during the learning unit period, and first predicted time data corresponding to the first predicted operation data, and
 control the storage unit to store the first usage pattern base data and the first operation schedule data, and
 control operation of the refrigerator according to the first operation schedule data, wherein the operation data comprise at least one of:
 data representing one or more operation modes performed by the refrigerator, or
 data representing whether or not the refrigerator has performed a load response, wherein the time data comprise at least one of:
 data representing a number of times in which a door of the refrigerator has been opened or closed within a unit time period, or
 data representing a number of times in which the refrigerator has operated according to an operation mode among the one or more operation modes within the unit time period, and wherein the control unit is further configured to:
 accumulate the time data based on (i) the number of times in which the door of the refrigerator has been opened or closed within the unit time period or (ii) the number of times in which the refrigerator has operated according to the operation mode within the unit time period, and
 based on a number of an accumulated time data for the unit time period being greater than a predetermined value that represents a frequency of accumulating data, apply a weight to the accumulated time data.

7. The refrigerator of claim 6, wherein the communication unit is configured to receive a second learning data set different from the first learning data set from the server, and
wherein the control unit is configured to generate second operation schedule data during a second prediction unit period based on mapping the second learning data set to at least a part of the first usage pattern base data.

8. The refrigerator of claim 7, wherein the first prediction unit period of the first operation schedule data and the second prediction unit period of the second operation schedule data are different from each other.

9. The refrigerator of claim 6, wherein the storage unit is configured to store the first usage pattern base data generated during the learning unit period and the second usage pattern base data generated after the learning unit period, and
wherein the control unit is configured to:
based on (i) mapping the first learning data set to a part of the first usage pattern base data and (ii) mapping the first learning data set to a part of the second usage pattern base data after mapping the first learning data set to the part of the first usage pattern base data, generate third operation schedule data that include second predicted operation data of the refrigerator and second predicted time data corresponding to the second predicted operation data.

10. A method for generating operation schedule data for a refrigerator, the method comprising:
receiving, by a communication unit of a server, first usage pattern base data generated from two or more refrigerators during a learning unit period, the first usage pattern base data including operation data performed during the learning unit period by the two or more refrigerators or one or more users and time data corresponding to the operation data;
inputting the first usage pattern base data to a processor of the server;
generating a first temporary learning data set corresponding to the first usage pattern base data, wherein generating the first temporary learning data set comprises updating at least a part of a first learning data set included in the server based on the first usage pattern base data;
generating a second learning data set based on the first temporary learning data set, wherein generating the second learning data set comprises receiving second usage pattern base data from the two or more refrigerator, inputting the second usage pattern base data to the processor, and generating a second temporary learning data set corresponding to the second usage pattern base data; and
transmitting, by the communication unit, the second learning data set to the two or more refrigerators to allow each of the two or more refrigerators to generate operation schedule data for controlling a forthcoming action of each refrigerator for a prediction unit period that is shorter than the learning unit period, the operation schedule data including predicted operation data related to the operation data performed in corresponding times during the learning unit period, and predicted time data corresponding to the predicted operation data,
wherein the operation data comprise at least one of:
data representing one or more operation modes performed by the refrigerator, or
data representing whether or not the refrigerator has performed a load response,
wherein the time data comprise at least one of:
data representing a number of times in which a door of the refrigerator has been opened or closed within a unit time period, or
data representing a number of times in which the refrigerator has operated according to an operation mode among the one or more operation modes within the unit time period, and wherein the method further comprises:
accumulating the time data based on (i) the number of times in which the door of the refrigerator has been opened or closed within the unit time period or (ii) the number of times in which the refrigerator has operated according to the operation mode within the unit time period, and
based on a number of an accumulated time data for the unit time period being greater than a predetermined value that represents a frequency of accumulating data, applying a weight to the accumulated time data.

11. The method of claim 10, wherein the first learning data set includes:
a first processing layer including one or more first nodes, each first node having a first output value generated during the learning unit period based on one or more values selected from the second usage pattern base data; and
one or more first links that are configured to generate the first output value based on applying at least one of a first weight factor or a first bias to the one or more values selected from the second usage pattern base data, and
wherein generating the first temporary learning data set comprises generating the first temporary learning data set based on adding a node or link to the first learning data set or removing a node or line from the first learning data set.

12. The method of claim 11, wherein the each of the first learning data set and the first temporary learning data set further includes:
a second processing layer including one or more second nodes, each second node having a second output value generated based on one or more values selected from the first output values of the one or more first nodes; and
one or more second links that connect the first processing layer and the second processing layer and that are configured to generate the second output value based on applying at least one of a second weight factor or a second bias to the one or more values selected from the first output values of the one or more first nodes.

13. The method of claim 1, wherein the operation data further comprise data representing operations of one or more components of the refrigerator, and
wherein the time data further comprise one or more time points corresponding to the operations of the one or more components of the refrigerator.

14. The method of claim 1, wherein the first learning data set comprises a weight factor and a bias, and
wherein mapping the first learning data set to the first usage pattern base data comprises at least one of:
multiplying at least a part of the first usage pattern base data by the weight factor, or
adding the bias to at least the part of the first usage pattern base data.

15. The refrigerator of claim 6, wherein the operation data further comprise data representing operations of one or more components of the refrigerator, and
wherein the time data further comprise one or more time points corresponding to the operations of the one or more components of the refrigerator.

16. The refrigerator of claim 6, wherein the control unit comprises a schedule generation module configured to, based on mapping the first learning data set to the first usage pattern base data, generate the first operation schedule data during the first prediction unit period.

17. The method of claim 10, wherein the operation data further comprise data representing operations of one or more components of each of the two or more refrigerators, and wherein the time data further comprise one or more time points corresponding to the operations of the one or more components of each of the two or more refrigerators.

* * * * *